(12) United States Patent
Horii et al.

(10) Patent No.: US 7,696,897 B2
(45) Date of Patent: Apr. 13, 2010

(54) SHELF-LIKE DISPLAY MACHINE AND IMAGE DISPLAY METHOD

(75) Inventors: Youichi Horii, Mitaka (JP); Tadaaki Ishikawa, Tsuchiura (JP); Takeshi Hoshino, Kodaira (JP); Isshu Nakajima, Fuchu (JP); Yukinobu Maruyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 474 days.

(21) Appl. No.: 11/822,957

(22) Filed: Jul. 11, 2007

(65) Prior Publication Data
US 2008/0055087 A1   Mar. 6, 2008

(30) Foreign Application Priority Data
Sep. 5, 2006   (JP) .............................. 2006-239724

(51) Int. Cl.
   *G08B 5/00*   (2006.01)
(52) U.S. Cl. ..................... 340/815.4; 340/999; 340/5.91
(58) Field of Classification Search .............. 340/815.4, 340/5.91, 999
   See application file for complete search history.

(56) References Cited

U.S. PATENT DOCUMENTS

| | | | | |
|---|---|---|---|---|
| 5,448,226 A | * | 9/1995 | Failing et al. ............. 340/10.51 |
| 6,105,004 A | * | 8/2000 | Halperin et al. ................ 705/28 |
| 6,108,367 A | * | 8/2000 | Herman et al. ............... 375/141 |
| 6,186,555 B1 | * | 2/2001 | Rawlings ...................... 283/81 |
| 7,286,111 B2 | * | 10/2007 | Stephenson, III ........... 345/104 |
| 2006/0232382 A1 | * | 10/2006 | Bauer et al. ................. 340/10.1 |
| 2008/0212314 A1 | * | 9/2008 | Swofford et al. ............. 362/126 |

* cited by examiner

*Primary Examiner*—Eric M Blount
(74) *Attorney, Agent, or Firm*—Stites & Harbison PLLC; Juan Carlos A. Marquez, Esq.

(57) ABSTRACT

The prior art in this field had a display portion of electronic paper at a part of a shelf and showed a problem that the display portion and the goods were hardly co-related to each other in response to the arrangement of the goods. In view of the foregoing, plural images arranged in response to the number of stages of the shelves to be displayed are irradiated with a light source after each of the images is corrected in correspondence with the optical path length ranging from the light source to the end of each of the shelves, each of the images is guided to the end of each of the shelves by plural reflector members and then the images are displayed at the ends. In addition, each of the images is guided to the end of each of the shelves by plural reflector members and the images are displayed at the ends after plural images (either still images or animations) arranged in response to the number of stages of shelves to be displayed are irradiated by the light source and the optical path lengths ranging from the light source to the end of each of the shelves are set to be substantially the same to each other.

18 Claims, 24 Drawing Sheets

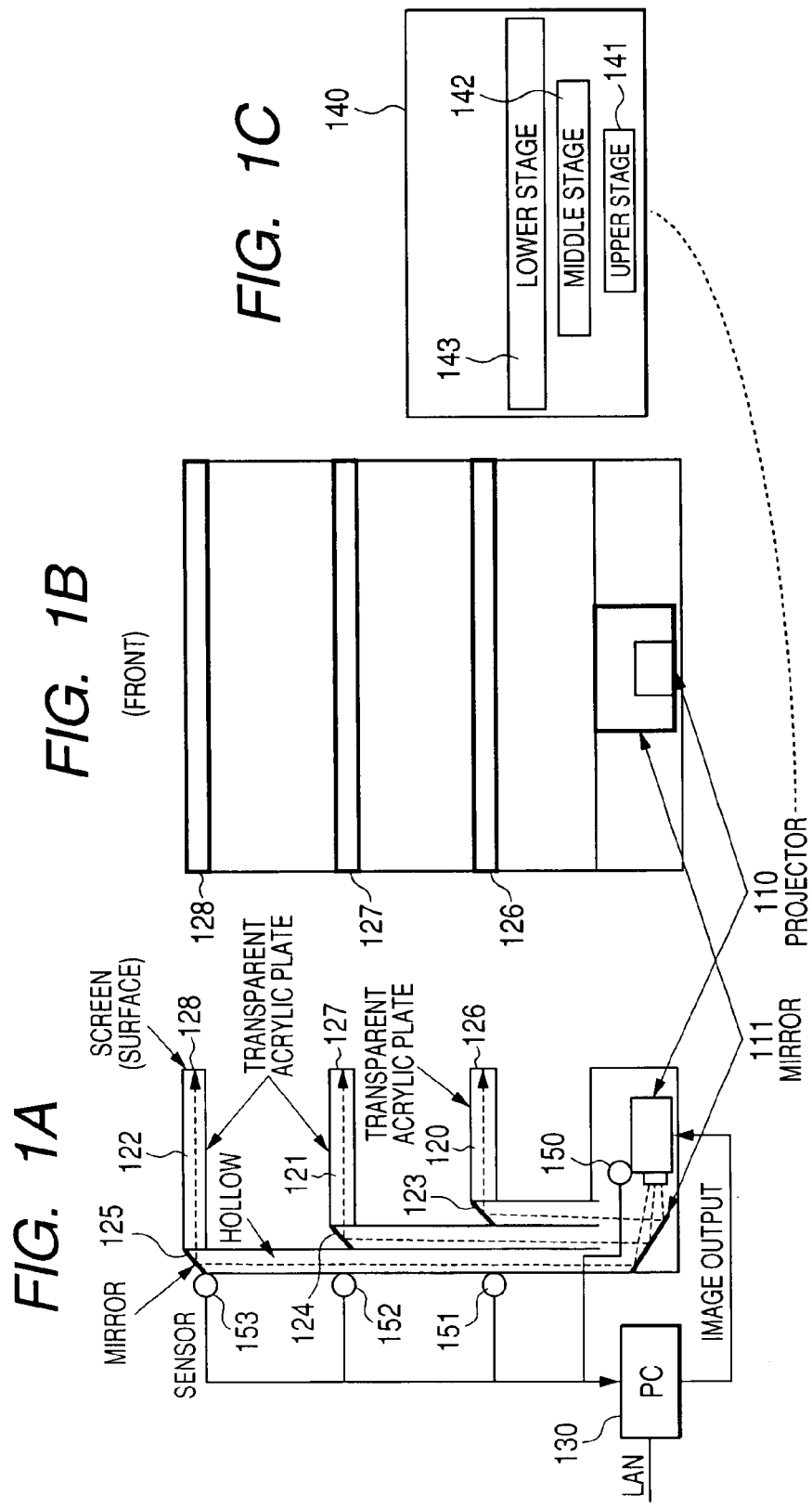

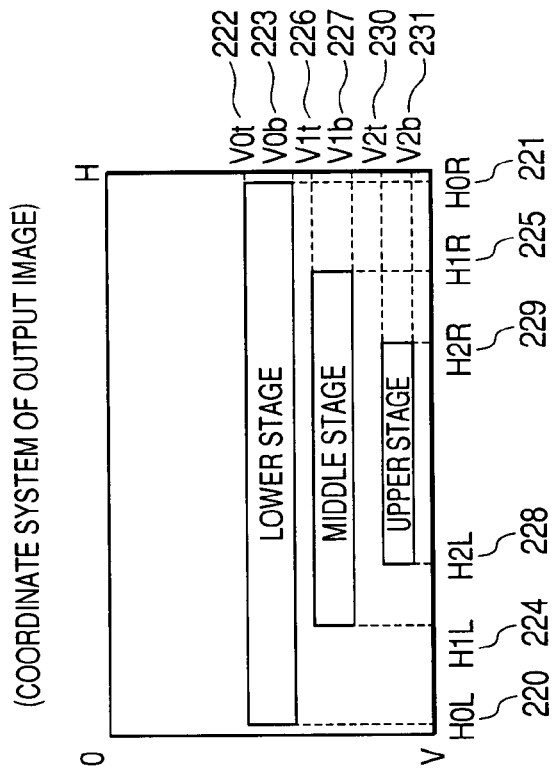
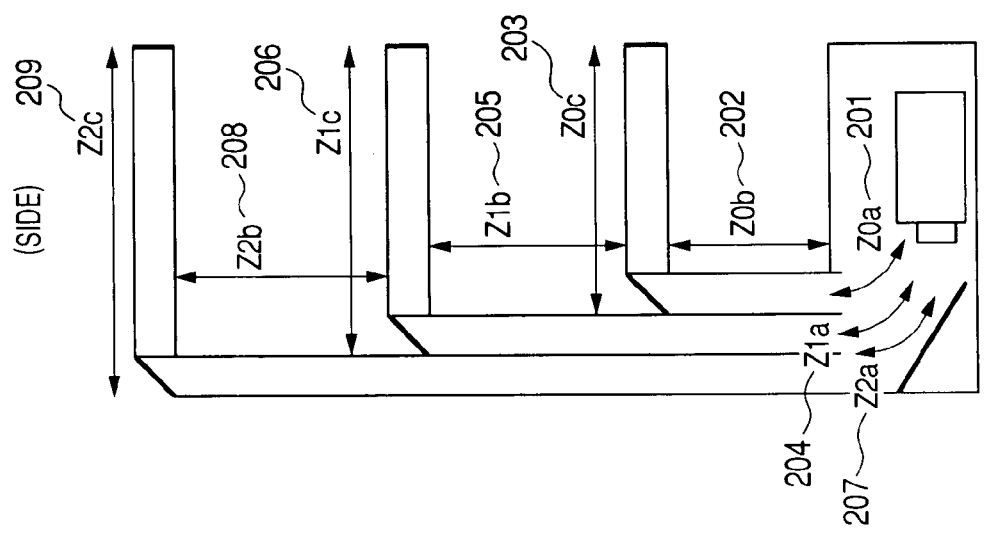

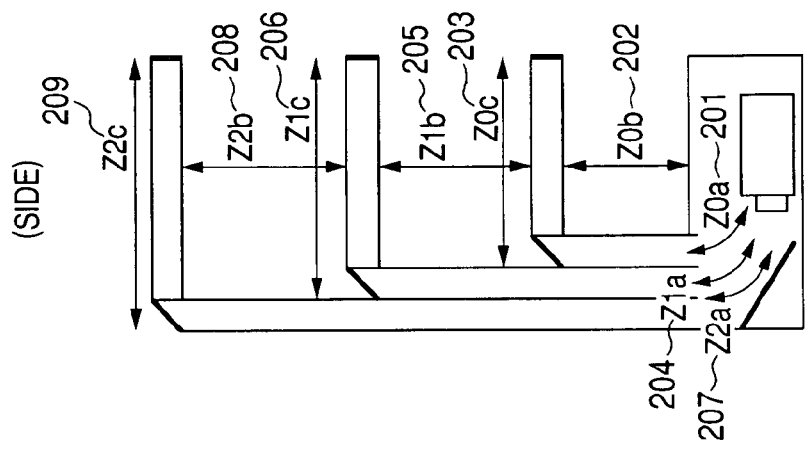
FIG. 6A (ORIGINAL IMAGE)
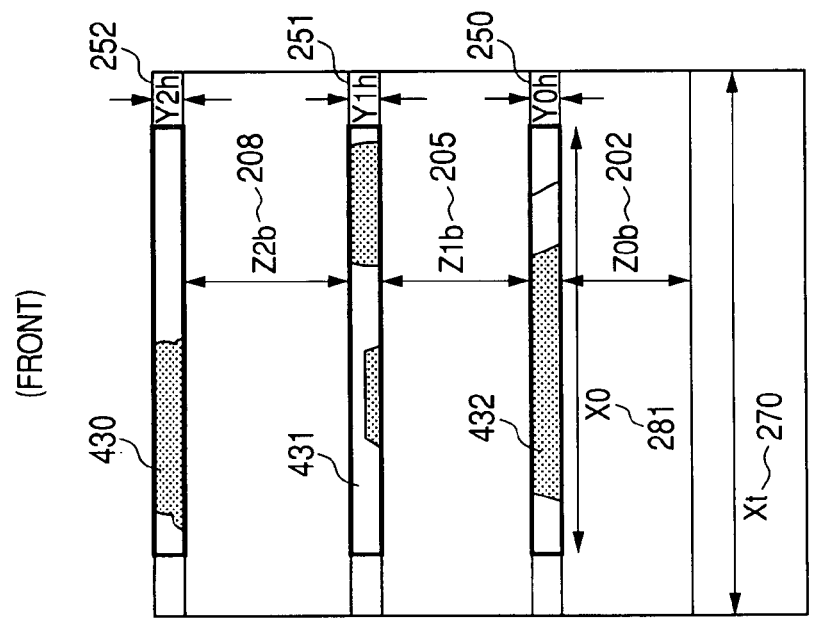
FIG. 6B (FRONT)
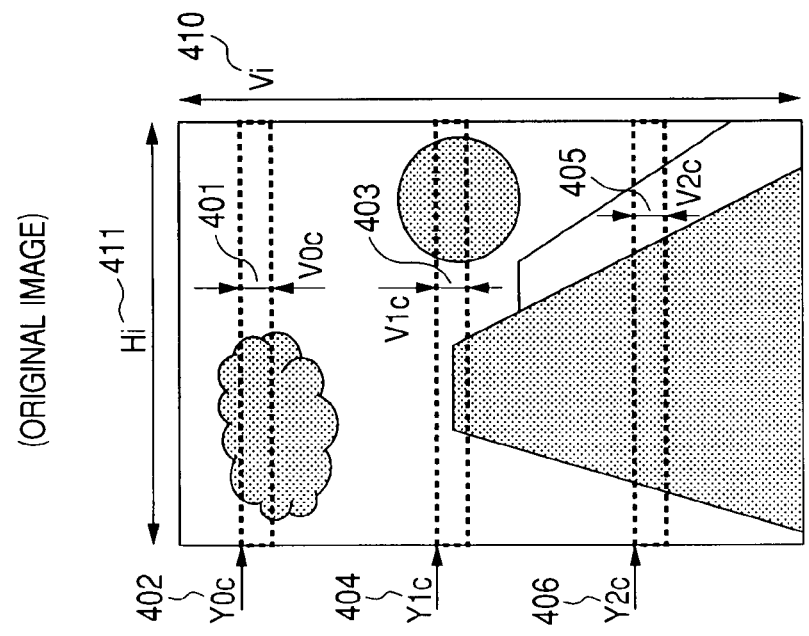
FIG. 6C (SIDE)

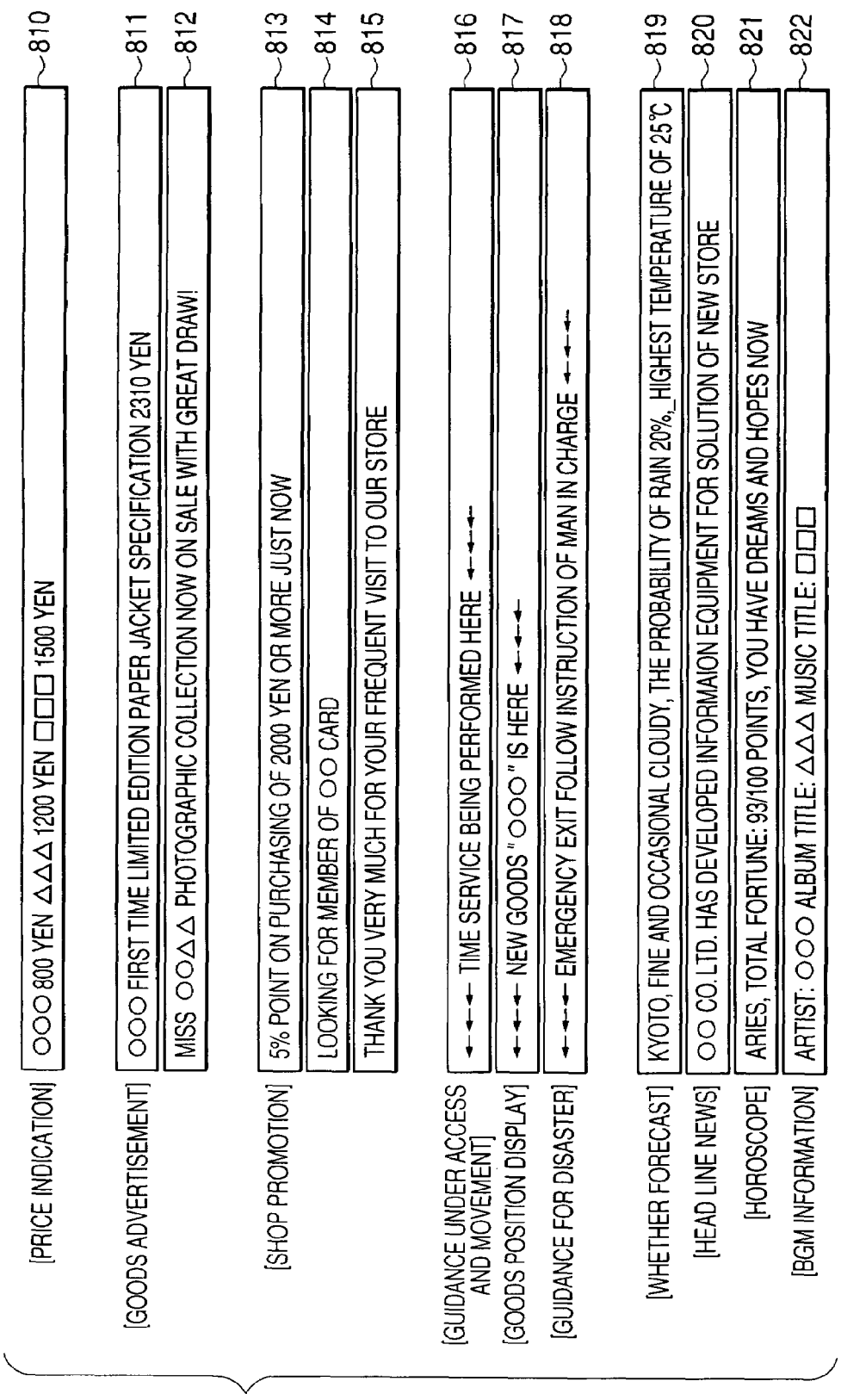

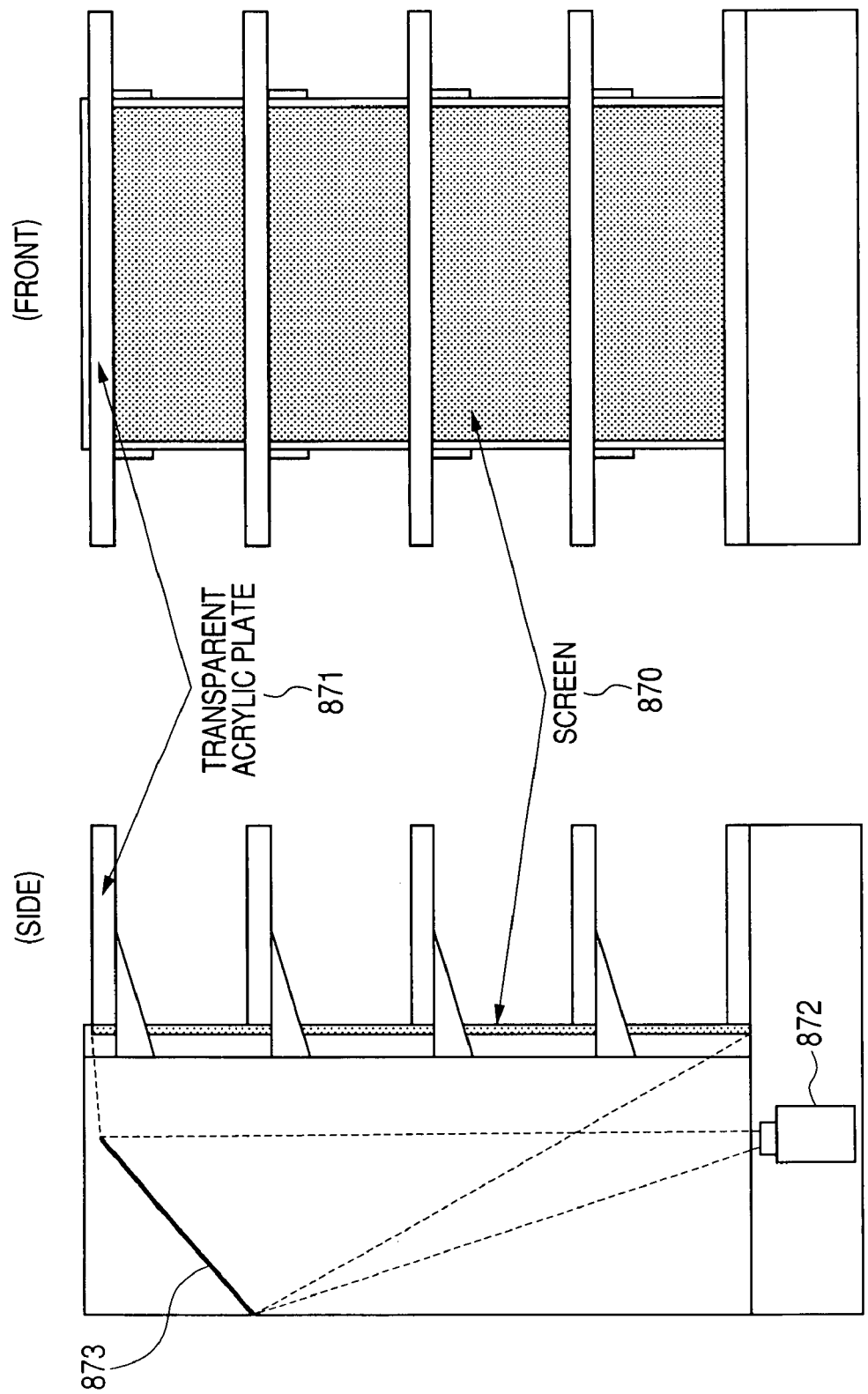

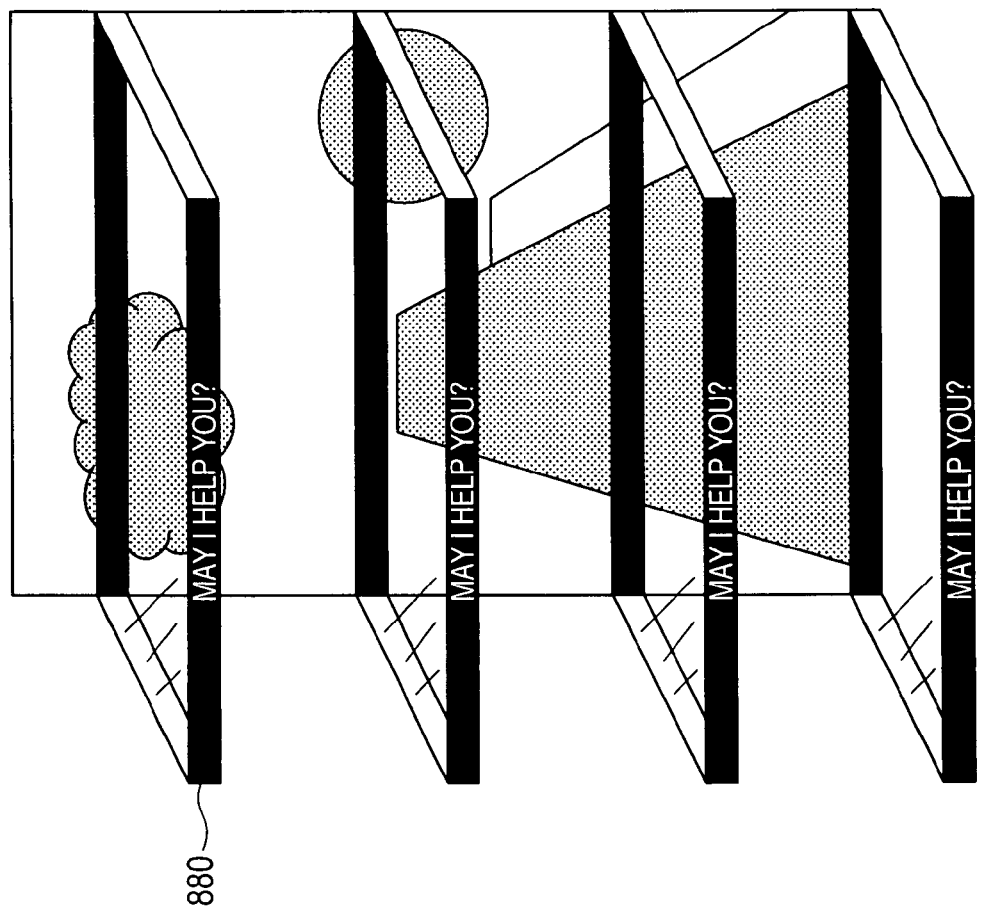
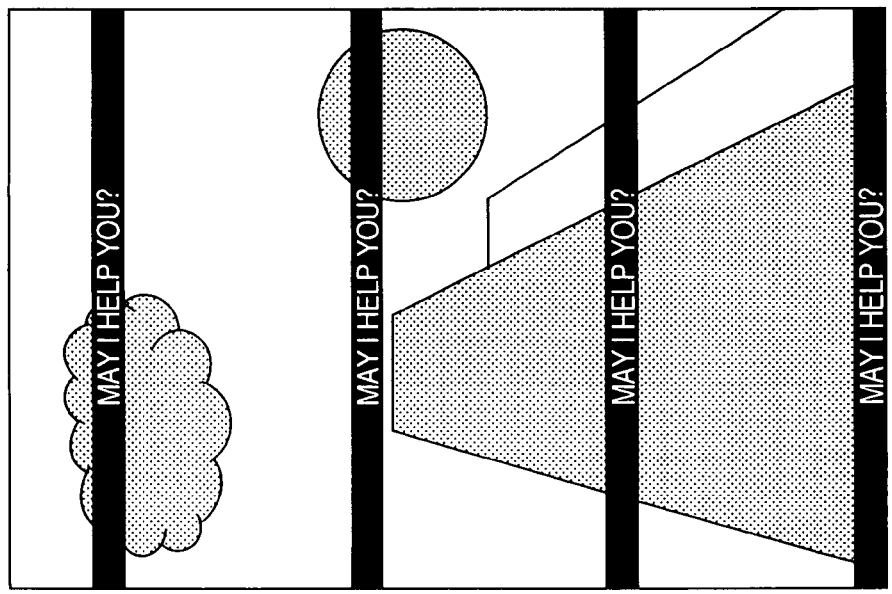

ical path length 1 ranging from the light source to the end of the first shelf plate and an optical path length 2 ranging from the light source to the end of the second shelf plate in such a way that the first image is displayed at the end of the

SHELF-LIKE DISPLAY MACHINE AND IMAGE DISPLAY METHOD

CLAIM OF PRIORITY

The present application claims priority from Japanese application JP 2006-239724 filed on Sep. 5, 2006, the content of which is hereby incorporated by reference into this application.

FIELD OF THE INVENTION

This invention relates to a shelf-like display machine and an image display method, for example, in which shelves or the like installed at stores such as retailers have an image display function.

BACKGROUND OF THE INVENTION

As have been already described in the non-patent document 1 below, there has been provided a proposal of method in which price tags at the shelves in a store such as a retailer shop are changed into electronic forms, prices and information on goods or the like are optionally changed over and they are displayed at the front ends of goods display shelves in a form of electronic paper.

SUMMARY OF THE INVENTION

However, the aforesaid prior art had a problem that it is hard to attain a correspondence between the display part and the goods under a certain arrangement of the goods because the display part with an electronic paper is arranged at a part of the shelf.

Additionally, it was necessary to prepare some special display substrates for changing all the lengths of the shelves into display segments and so their price was expensive. In addition, as shown in FIG. 32, it was necessary to prepare some signal lines and wirings 902 for supplying a power supply up to display segments 901 and so it was necessary to perform a processing for shielding the wirings with opaque raw material and connecting the wirings whenever the shelves were required to be moved.

In view of the situation as above, this invention provides a shelf-like display machine and an image display method in which an optical path of a light source such as a projector for projecting an image is controlled to display some images at the ends of plural shelf plates.

(1) Plural images (either still images or animations) prepared in response to the number of stages of the shelves to be displayed are projected from the light source after each of the images is corrected in response to the optical path length ranging from the light source to the end of each of the shelves and then each of the images is guided to the end of each of the shelves with plural reflection members and the images are displayed at the aforesaid ends.

More practically, according to one aspect of the present invention, there is provided a shelf-like display machine comprising a light source for outputting an image; a first reflector member for reflecting the image projected from the light source; a first shelf plate and a second shelf plate in which light can be transmitted through their inner portions; a rear member supporting the first and second shelf plates in which light can be transmitted at their inner portions; a second reflection member for guiding the image reflected by the first reflector member and guided through the rear member to the first shelf plate; and a third reflector plate for guiding the image reflected by the first reflector member and guided through the rear plate to the second shelf plate; the image having a first image and a second image, the light source outputting the first image and the second image upon performing a correction processing in correspondence with an optical path length 1 ranging from the light source to the end of the first shelf plate and an optical path length 2 ranging from the light source to the end of the second shelf plate in such a way that the first image is displayed at the end of the first shelf plate opposite to the rear member and the second image is displayed at the end of the second shelf plate opposite to the rear member.

(2) Plural images (either still images or animations) prepared in response to the number of stages of the shelves to be displayed are projected from the light source and the optical path lengths ranging from the light source to the end of each of the shelves are substantially made equal to each other, and then each of the images is guided to the end of each of the shelves by plural reflector members to display the images at the end.

More practically, according to another aspect of the present invention, a shelf-like display machine includes a light source for outputting an image; a first reflector member for reflecting the image projected from the light source; a first shelf plate and a second shelf plate in which light can be transmitted through their inner portions; a rear member supporting the first and second shelf plates in which light can be transmitted at their inner portions; a second reflection member for guiding the image reflected by the first reflector member and guided through the rear member to the first shelf plate; and a third reflector plate for guiding the image reflected by the first reflector member and guided through the rear member to the second shelf plate; and the image has a first image and a second image; an optical path length 1 ranging from the light source to the end of the first shelf plate and an optical path length 2 ranging from the light source to the end of the second shelf plate become substantially the same to each other in such a way that the first image is displayed at the end of the first shelf plate opposite to the rear member and the second image is displayed at the end of the second shelf plate opposite to the rear member.

(3) The present invention provides a method in which when an image is displayed at plural screens arranged in spaced-apart relation, plural regions are extracted from the original image under a similar shape to that of the plurality of screens and while keeping positional relations of the plurality of screens; the plurality of regions are extracted while being scrolled at a predetermined speed in a direction connecting the plurality of regions; each of the regions is enlarged or reduced in such a way that a difference in the magnifying power may be corrected in reference to a difference in optical path length ranging from the light source to each of the screens so as to display the image to each of the screens.

More practically, the present invention provides an image display method for displaying an image on the spaced-apart first and second screens which includes the steps of extracting a first region of which shape is similar to that of the first screen and a second region of which shape is similar to that of the second screen from the image while keeping a positional relation between the first and second screens; extracting the first region and the second region from the image while scrolling them at a predetermined speed in a direction where the first region and the second region are connected, correcting a difference in magnifying power caused by different optical path lengths ranging from a light source for projecting the image to each of the screens and correcting to expand or reduce the first region and/or the second region; and projecting the first region to the first screen and the second region to the second screen.

It becomes possible to display easily images (information such as animations, still pictures, letters or the like) at the end of the shelf-like display machine without preparing any special display substrates and arranging a wiring for every shelf. Additionally, detailed information about goods, for example, can be effectively transmitted to the customers at a store selling goods.

BRIEF DESCRIPTION OF THE DRAWINGS

FIGS. 1A, 1B, and 1C are schematic views for showing one preferred embodiment of the present invention;

FIGS. 2A and 2B show a first image generation method of one preferred embodiment of the present invention;

FIGS. 6A, 6B, and 6C show a fifth image generation method of one preferred embodiment of the present invention;

FIG. 25 shows examples of letters to be displayed at a display end;

FIG. 30 is a view for showing a state in which a rear projector is arranged at the rear of each of the shelves to display an image;

FIGS. 31A and 31B show an example in which an image is displayed at the back of shelves of one preferred embodiment of the present invention.

DETAILED DESCRIPTION OF THE PREFERRED EMBODIMENTS

First Embodiment

Figure 3:
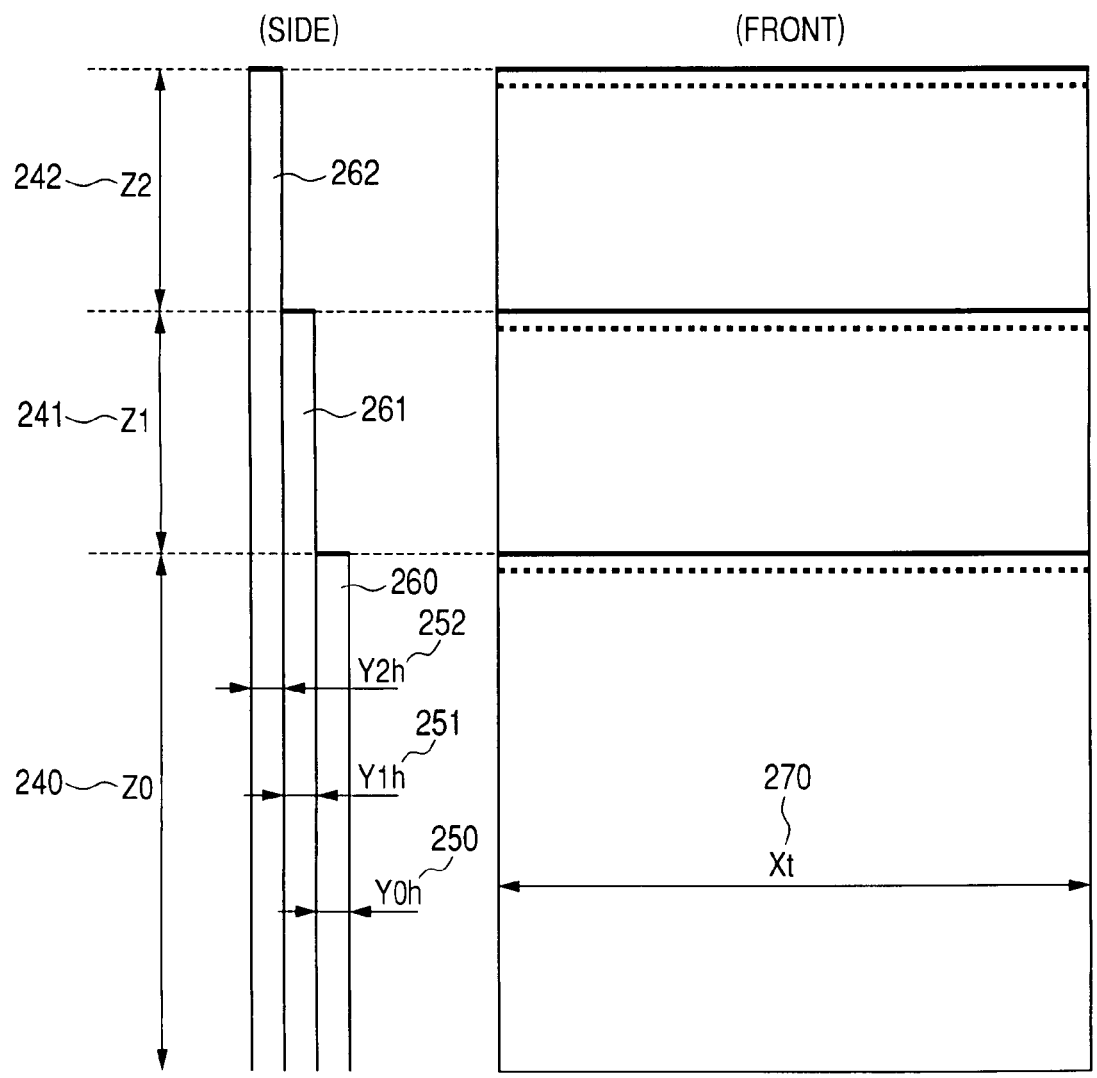
FIG. 3 shows a second image generation method of one preferred embodiment of the present invention.

FIGS. 1A to 1C show a side elevational view and a front elevational view of shelves of one preferred embodiment and an example of display of images to be projected to a projector. As shown in the side elevational view of FIG. 1A and the front elevational view of FIG. 1B, light projected from the light source such as a projector 110 projecting an image is reflected upward through a reflector member such as a mirror 111, the light passes through the rear member constituted by a member with hollow state or characteristic allowing light to be passed through it, the light is reflected again with mirrors 123, 124, and 125 arranged at the backs of the shelves 120, 121, and 122 having light transparent characteristic (using cavity and member through which light is transmitted, for example) and then the light is projected to the ends 126, 127, and 128 of the shelves. Screen raw material for collecting light or dispersing light is applied to the ends of the shelves to enable either letters or images projected by the projector to be projected to the ends. In addition, as described later, the image can be projected onto the ends also by constituting the shelf plates in such a way that when light transmitted at their inner portions to both front and rear of the shelves, the light shows total internal reflection there even if the screen raw material is not used. An image generating device such as a PC 130 or the like is connected to the projector 110 so as to output images including images 141, 142, and 143 to be displayed at each of the shelves as shown at 140 in FIG. 1C. In response to whether or not an up-and-down reversal function of the projector is used, it is set whether or not the up-and-down of the image to be sent to the projector is performed. FIG. 1C shows a reversed example. A method for generating an image for each of the shelves will be described later in reference to FIGS. 2 to 5. The image generating device is connected to the network such as LAN, for example, and it is also applicable that the content of the outputted image is controlled from outside. In addition, arrangement of sensors 150, 151, 152, and 153 also enables an approaching of a person near the shelf or a person's touch at the shelf to be detected and a displayed content to be dynamically changed.

(Image Generating Method)

Then, referring to FIGS. 2 to 5, there will be described a method for generating an image for each of the shelves to be projected to the projector of the present invention. Although an example in which the number of shelves is three will be described as follows, the number of shelves can be calculated by a similar method whatever numbers may be applied. More practically, this method is carried out by inputting the design values such as shelf height or shelf width (Z0$a$, Z0$b$, Z0$c$, Z1$a$, Z1$b$, Z1$c$, Z2$a$, Z2$b$, and Z2$c$ of 201 to 209 in FIG. 2A, for example) and calculating display rectangular areas at each of the shelves to be projected to the projector (H0L, H0R, V0$t$, V0$b$, H1L, H1R, V1$t$, H2L, H2R, V2$t$ and V2$b$ of 220 to 231 in FIG. 2B, for example).

In order to simplify the description, the optical paths are developed in a straight line as shown at 260, 261, and 262 in FIG. 3 and a method for calculating the display rectangular areas will be described as follows. In this case, Z0, Z1, and Z2 of 240 to 242 in FIG. 3 can be attained in reference to their design values as follows.

$$Z0=(Z0a+Z0b+Z0c)$$

$$Z1=(Z1a+Z1b+Z1c)Z0$$

$$Z2=(Z2a+Z2b+Z2c)(Z0+Z1)$$

In addition, thicknesses Y0$h$, Y1$h$, and Y2$h$ of each of the shelves from 250 to 252 and a width Xt (270) of each of the shelves are also design values.

Figure 4:
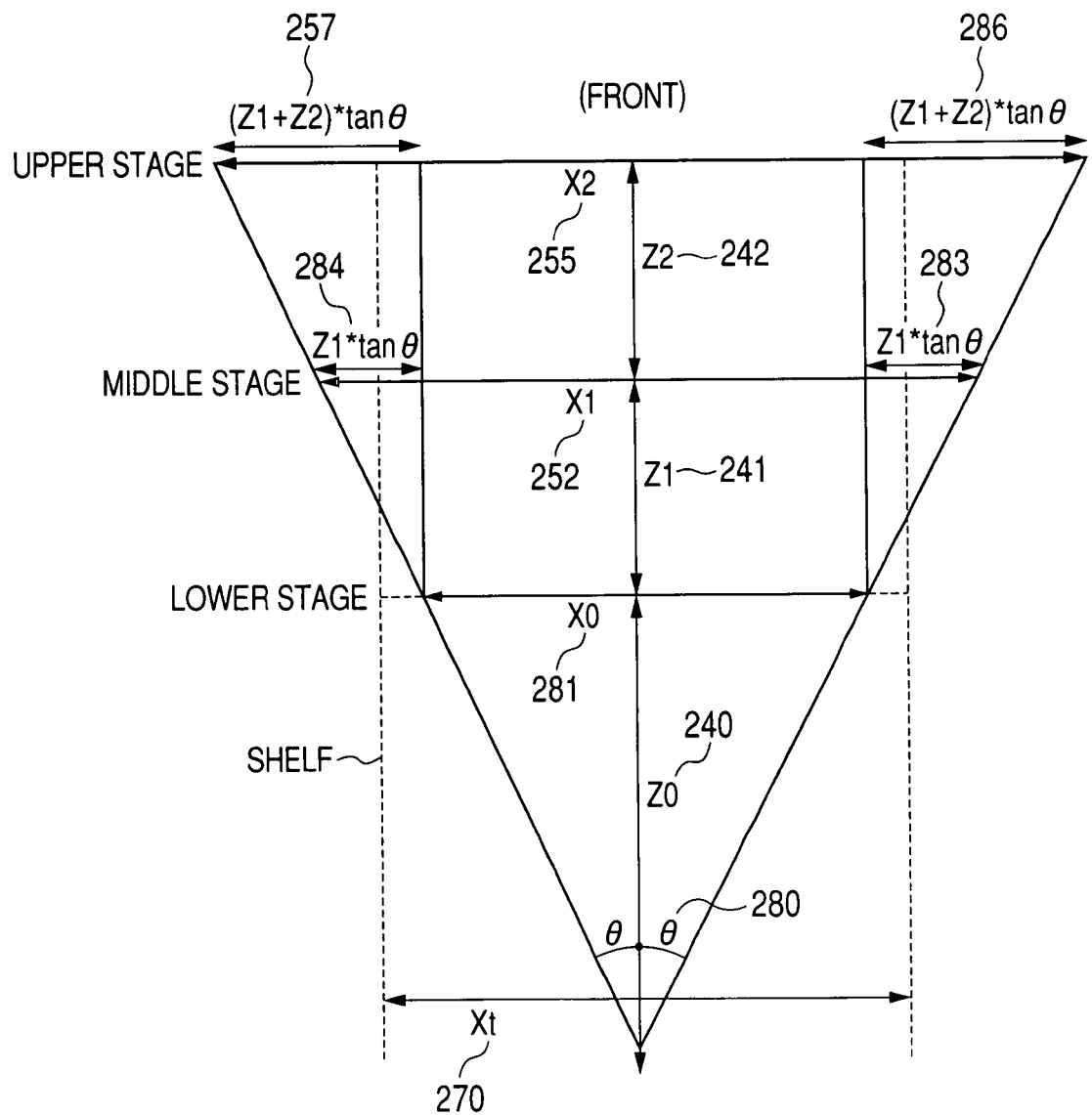
FIG. 4 shows a third image generation method of one preferred embodiment of the present invention.

Then, referring to FIG. 4, the method for calculating the value in a horizontal direction will be described as follows. That is, drawing regions (H0L, H1L, H2L, H2R, H1R, H0R) of the images to be projected to the end of the shelf are calculated in reference to the design values such as each of the sizes of the shelf (Z0, Z1, Z2: height, Xt: width, θ: image angle (280) in a horizontal direction of the projector, H: a resolution in a horizontal direction of the projector). At first, when a length in a horizontal direction within the projection range X0(281) of the lower stage is included within a width Xt(270) of the shelf, all the ranges that can be projected are used. At this time, since a relation of X0=2*Z0*tan θ is formulated, H0L=0, H0R=H can be attained. Next, since a length X1(282) in a horizontal direction within a projection range in the middle stage is (X0+2*Z1*tan θ) under application of 283, it can be attained as H1L=H*(Z1*tan θ)/X1, H1R=H H*(Z1*tan θ)/X1, H2R=H H*(Z1+Z2)*tan θ)/X1. Further, since a length X2(285) in a horizontal direction within a projection range in the upper stage is (X0+2*(Z1+Z2)*tan θ) under application of 286, it can be attained as H2L=H*(Z1+Z2)*tan θ)/X1, H2R=H H*(Z1+Z2)*tan θ)/X1, H2R=H H*(Z1+Z2)*tan θ)/X1.

Figure 5:
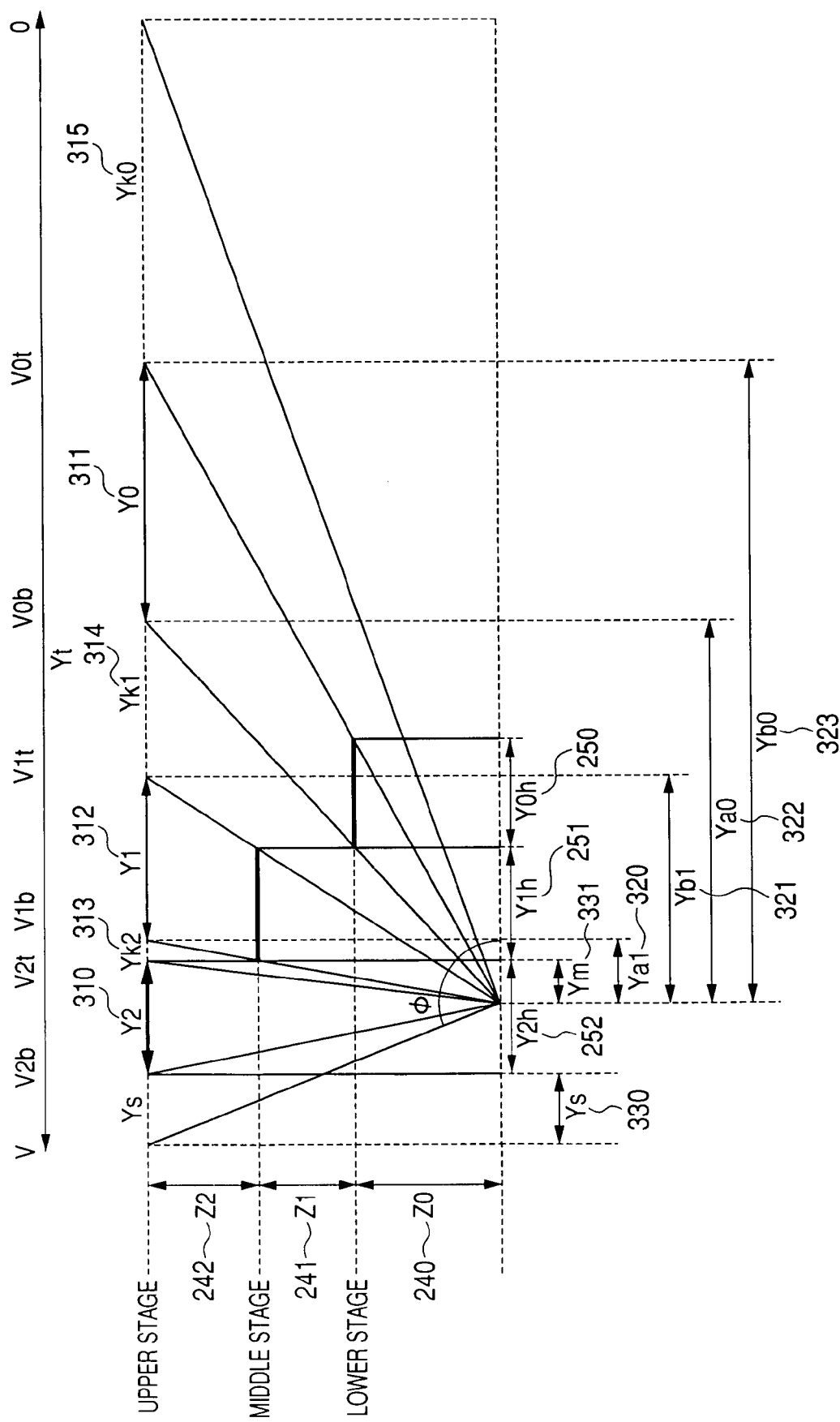
FIG. 5 shows a fourth image generation method of one preferred embodiment of the present invention.

Next, referring to FIG. 5, there will be described a method for calculating values of the projector in its vertical direction. That is, drawing regions of image to be projected to the end of the shelf (V0$t$, V0$b$, V1$t$, V1$b$, V2$t$, V2$b$) are calculated in reference to the design values of the shelf (Z0, Z1, Z2: height, Y0$h$, Y1$h$, Y2$h$: shelf thickness, p: image angle in a vertical direction and Ys(330), Ym(331) got by a mounting angle of the projector. In this case, to make the drawing easier to understand, the illustration is shown with the vertical direction of the optical path being compressed. A length Y2(310) in a vertical direction in a projection range at the upper stage is (Z0+Z1+Z2)/tan φ. A rate among the lengths Y0(311), Y1(312) and Y2(310) when the optical path to be projected to the end of each of the shelf plates is extended and the clearance lengths Yk2(313), Yk1(314), Yk0(315) becomes a rate in a vertical direction of the original image. Each of the distances Ya1(320), Yb1(321), Ya0(322) and Yb0(323) from the center of optical axis in this figure can be attained like Ya1=(Ym)*(Z0+Z1+Z2)/(Z0+Z1), Yb1=(Ym+Y1$h$)*(Z0+Z1+Z2)/(Z0+Z1), Ya0=(Ym+Y1$h$)*(Z0+Z1+Z2)/Z0, Yb0=(Ym+Y1$h$+Y0$h$)*(Z0+Z1+Z2)/Z0. In addition, since the relations of Y2=Y2$h$, Yk2=Ya1 Ym, Y1=Yb1 Ya1, Yk1=Ya0 Yb1, Y0=Yb0 Ya0 are attained, and finally, vertical coordinate of the images to be displayed can be attained in reference to the design values, like V2$b$=V V*((Ys/Yt), V2$t$=V V*((Ys+Y2)/Yt), V1$b$=V V*((Ys+Y2+Yk2)/Yt), V1$t$=V V*((Ys+Y2+Yk2+Y1)/Yt), V0$b$=V V*((Ys+Y2+Yk2+Yk1)/Yt), V0$t$=V V*((Ys+Y2+Yk2+Y1+Yk1+Y0)/Yt).

Next, referring to FIGS. 6A to 6C, there will be described a method for calculating a clipping region in reference to the original image when images such as photographs and illustrations are displayed at a shelf. That is, the regions of original image to be clipped (V0$c$, Y0$c$, V1$c$, Y1$c$, V2$c$ and Y2$c$ from 401 to 406 in FIG. 6A) are calculated in reference to the aforesaid design values of the shelf. In this case, each of the vertical and lateral resolutions of the original image (the number of pixels) shall be defined as Vi(410) and Hi(411), respectively. In this case, an aspect ratio displayed at the shelf is X0 in FIG. 6C: (Y0$h$+Z1$b$+Y1$h$+Z2$b$+Y2$h$). If it is assumed that a clipping is carried out in such a way that the former aspect ratio is coincided with an aspect ratio Hi: (Y2$c$ Y0$c$+V2$c$) clipped from the original image in FIG. 6A, it can be attained as a relation of (Y2$c$ Y0$c$+V2$c$)/Hi=(Y2$h$+Z2$b$+Y1$h$+Z1$b$+Y0$h$)/X0. Since an aspect ratio of a lateral rectangle cut of the original image is equal to an aspect ratio displayed at each of the shelves, it can be attained as a relation of V0$c$/Hi=Y2$h$/X0, V1$c$/Hi=Y1$h$+Z1$b$+Y0$h$)/X0. In addition, since an aspect ratio of a rectangle enclosed by the two clipped rectangles is equal to an aspect ratio of clearance of the shelves, it can be attained as (Y1$c$ Y0$c$ V0$c$)/Hi=Z2$b$/X0, (Y2$c$ Y1$c$ V1$c$)/Hi=Z1$b$/X0. If the value of Y0$c$ were determined in reference to the foregoing five equations, the remaining five variables Y1$c$, Y2$c$, V0$c$, V1$c$ and V2$c$ could be attained. In addition, increasing or decreasing the value of Y0$c$ allows the image to be displayed while scrolling the image in a vertical direction.

Figure 7:
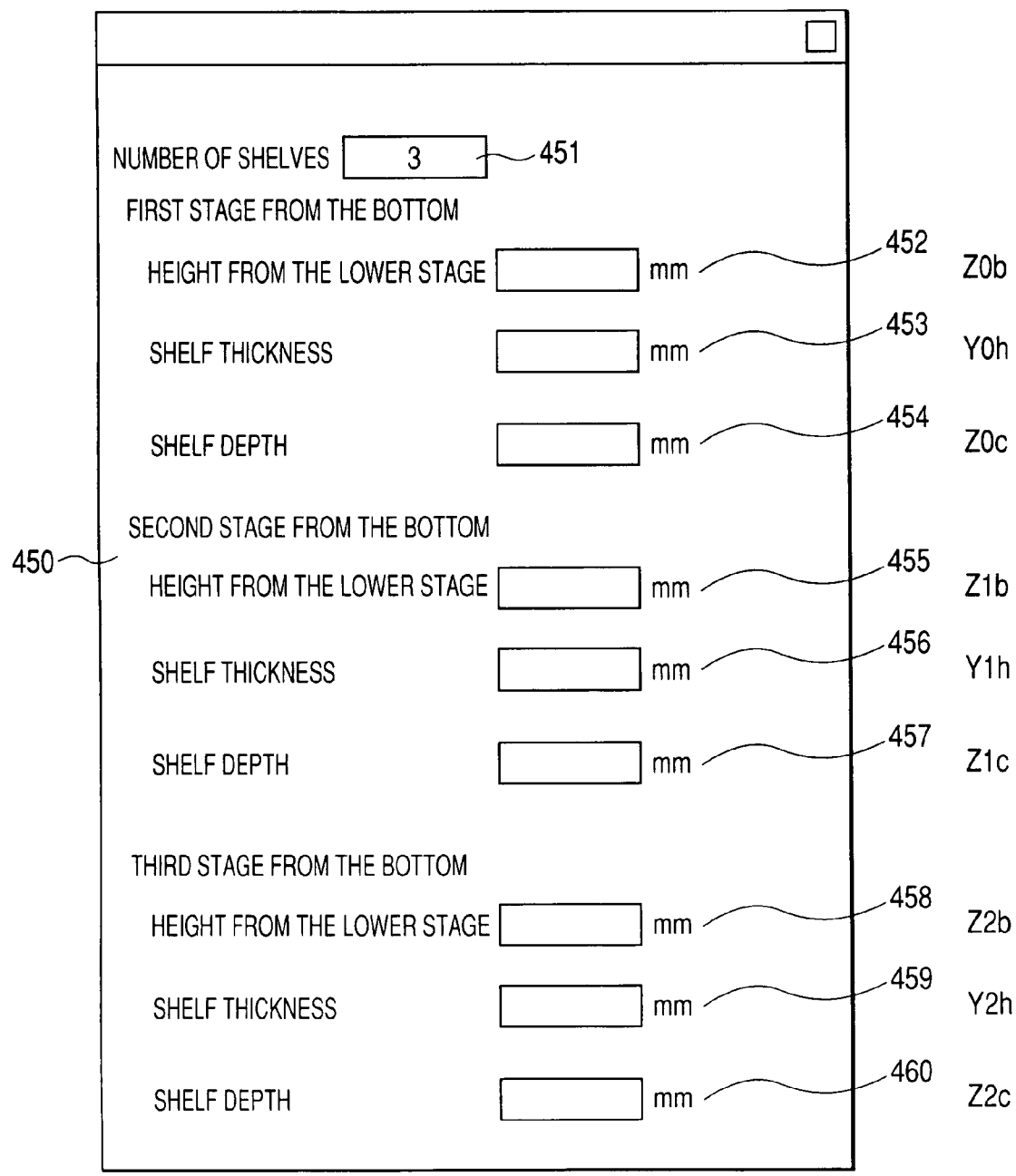
FIG. 7 is an illustrative view for showing a size inputting means of a shelf display machine.

Next, referring to FIG. 7, an input screen 450 for the design values will be described as follows. This input screen can be set through PC outputting the images, for example.

Reference numeral 451 denotes a region for inputting the number of shelves and reference numerals 452, 453, and 454 denote a region for inputting a height from the lower stage, a region for inputting a shelf thickness and a region for inputting the deep size of a shelf, respectively, and each of them corresponds to Z0$b$, Y0$h$, and Z0$c$. Similarly, reference numerals 455, 456, and 457 correspond to Z1$b$, Y1$h$, and Z1$c$ and reference numerals 458, 459, and 460 correspond to Z2$b$, Y2$h$, and Z2$c$. In this way, the design values are inputted, and the coordinate system for the image to be outputted is calculated with the PC 130 and projected to the projector 110.

Figure 8A:
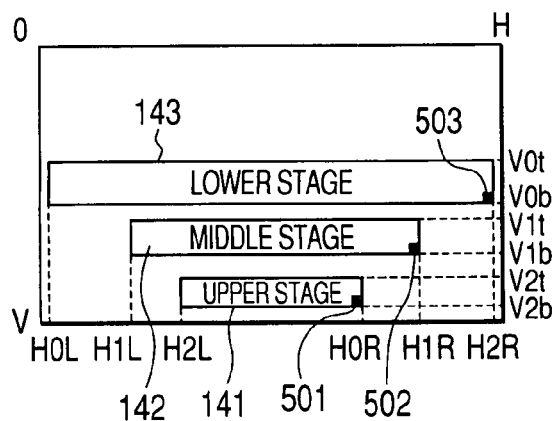
FIGS. 8A, 8B, and 8C are illustrative views for showing a first image adjustment method.
Figure 8B:
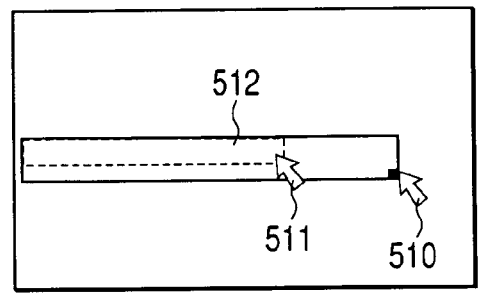
Figure 8C:
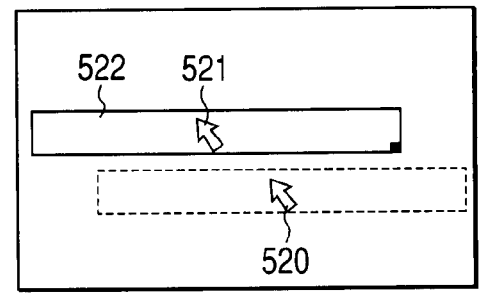

Next, referring to FIGS. 8A, 8B, and 8C, there will be described a method for fine adjusting a value of image area displayed at the projector calculated in reference to the design values with a graphical user interface. The screen calculated by the aforesaid method is displayed as shown in FIG. 8A under a state in which the display is connected to the PC 130 connected to a pointing device. Each of reference numerals 141, 142, and 143 in FIG. 8A denotes the image display region at each of the upper stage, middle stage and lower stage, and rectangles for rubber band indicated at 501, 502, and 503 are displayed at the right lower portion of each of the rectangles. A button for the pointing device is depressed (510) under a state in which cursors are present on these pointing devices and the cursor position (511) when the button is released is applied as a coordinate at the right lower portion of a new rectangle (512). In addition, as shown in FIG. 8C, when the button is depressed (520) under a state in which the cursor is present within the rectangles 141, 142, and 143 and also within the region other than the rectangles for the rubber bands, a difference between the horizontal direction and the vertical direction with respect to the coordinate (521) of the cursor when the button is depressed is added to the left upper coordinate and the right lower coordinate is applied as a coordinate for a new rectangle (522). These operations are carried out through a drug-and-drop action of the mouse, for example.

Figure 9:
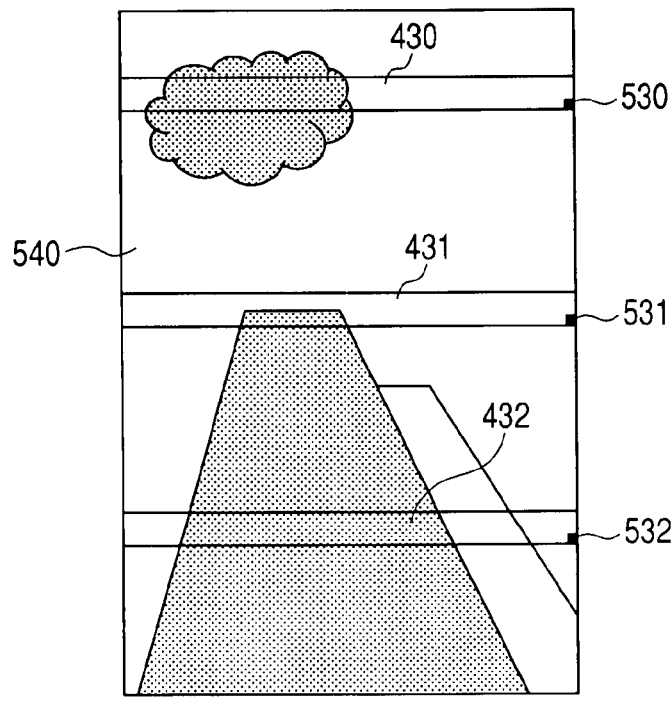
FIG. 9 is an illustrative view for showing a second image adjustment method.

Next, referring to FIG. 9, there will be described a fine adjustment for a clipping region. On the original image 540 are displayed clipping regions 430, 431, and 432 and the rectangles for a rubber band similar to that of FIG. 8. When the rectangles 530, 531, and 532 for the rubber band are selected within the clipping region, a width of the clipping region in a vertical direction is adjusted and when other rectangles are selected, a position of the clipping region in a vertical direction is adjusted. Also in this case, these operations are carried out through a drug-and-drop with a mouse.

(Structure of Shelf-like Member)

Figure 10C:
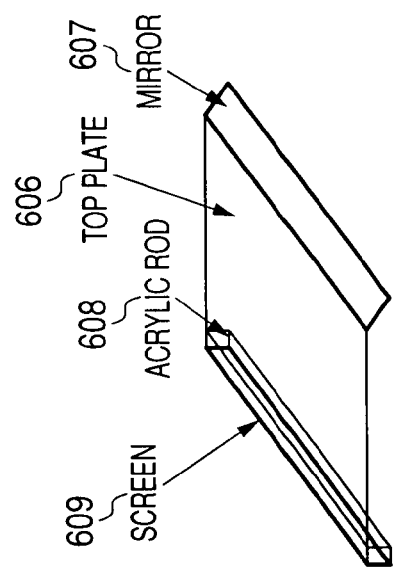
FIGS. 10A, 10B, 10C, 10D, 10E, and 10F show some examples of a reflector member.
Figure 10B:
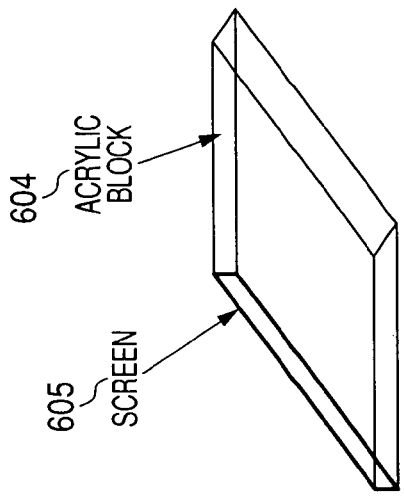
Figure 10A:
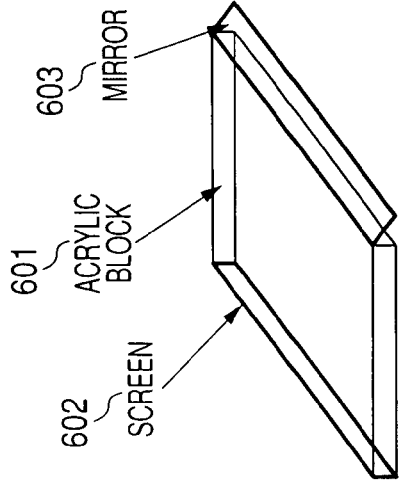
Figure 10F:
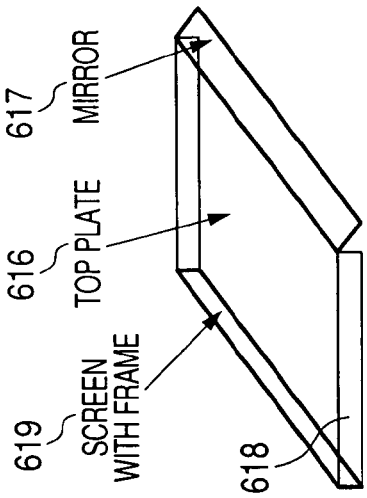
Figure 10E:
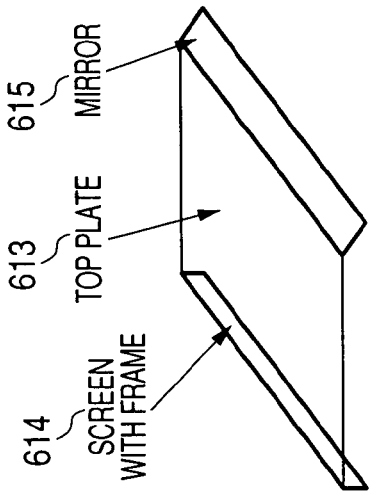
Figure 10D:
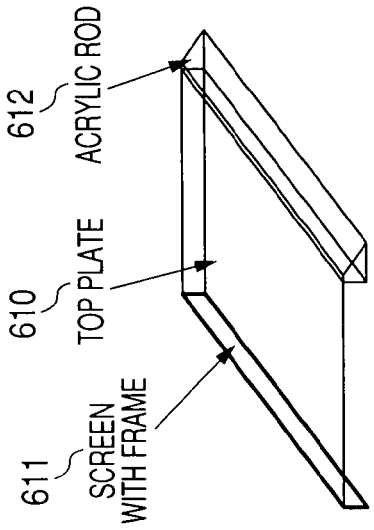

Next, referring to FIGS. 10A to 10F, there will be described examples of a structure of the shelf-like member. Requirements necessary for the structure of the shelf-like member of the present invention consist in the fact that light projected from below is reflected at the back of the shelf by about 90° and then projected to the end of the shelf. In FIGS. 10A to 10F, each of the left sides corresponds to the front of the shelf where the image is displayed and each of the right sides corresponds to the back of the shelf where the light is reflected by about 90°. FIG. 10A shows an example in which a screen 602 having a function for dispersing or focusing light is attached to the front of a block 601 such as acryl resin or glass having a high transmittance of light and a mirror 603 is arranged at the back of the block in an inclined state. This structure is manufactured by the simplest manufacturing method. FIG. 10B shows an example in which an end 605 at the back of the block 604 is machined to show a slant surface in place of the mirror and a screen 606 is arranged at the front of the block under utilization of characteristic of total reflection of light at this surface. Since this structure does not show any displacement of the mirror, a re-adjustment by vibration or the like after its correct design is not necessary. FIG. 10C shows an example in which a mirror 608 is arranged at the back lower portion of a transparent or opaque top plate 606, a rod-like raw material 608 such as acryl resin or glass with a high light transmittance is arranged at the lower portion of the front and a screen 609 is arranged. This structure enables utilization of expensive transparent raw material such as acryl resin or the like to be reduced. FIG. 10D shows an example in which a screen 611 with a frame is arranged at the lower portion of the front of the top plate 601, and a rod-like raw material 612 of high light transmittance such as acryl resin or glass and the like machined to have a slanted state in respect to the shelf plate surface such as a triangular column or truncated trapezoid column, for example, is arranged at the lower portion of the back of the shelf. Light projected from below shows a total reflection at the slant surface of the acryl resin rod 612 and is projected to the screen 611. This structure enables a strain of the reflector member to be reduced more as compared with that of a planer-like mirror. FIG. 10E shows an example in which a screen 614 with a frame is arranged at the lower portion of the front of the top plate 613, and a mirror 615 is arranged at the lower portion of the back of the shelf. This structure does not require at all using an expensive transparent raw material such as acryl resin or the like. FIG. 10F shows an example in which a mirror 617 is arranged at the lower portion of the back of the top plate 616, a frame 618 for assuring a strength is arranged at the lower portion of the side and a screen 619 with a frame is arranged at the lower portion of the front of the shelf. This structure enables light to be prevented from being leaked out of the side of the shelf plate.

Figure 11A:
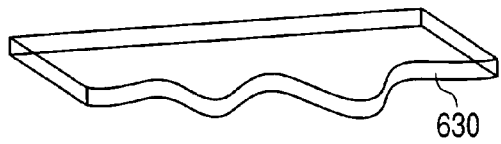
FIGS. 11A, 11B, 11C, and 11D show some examples of a display end.
Figure 11C:
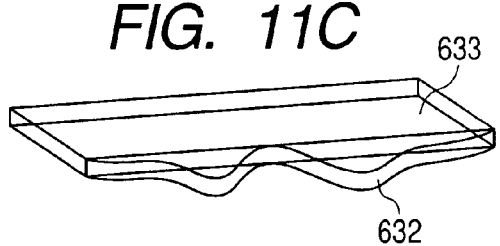
Figure 11B:
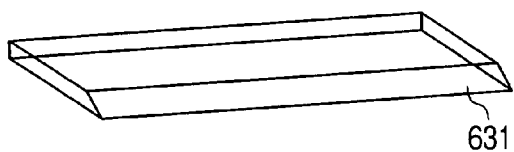
Figure 11D:
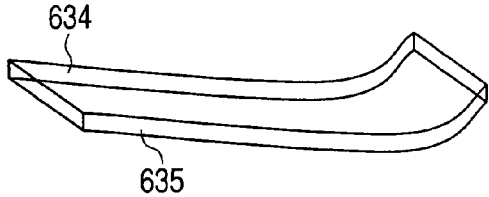

Referring to FIGS. 11A to 11C, there will be described shapes of the shelf. As has been described up to now, it is also possible to apply a shape as follows, for example, in addition to a shelf of cubic-block shape. FIG. 11A shows an example in which an end 630 of the shelf where the image is displayed has a curved surface. When some letters are expressed to scroll at the end in a lateral direction, this structure can provide an effect that the letters are seen to flow in a cubic manner in a forward or rearward direction. FIG. 11B shows an example in which an end 631 is machined into a slant surface and its display area is made wide. This structure improves a visual recognition when the shelf is mounted at a level lower than a customer's point of view, for example. FIG. 11C shows an example in which a band-like screen raw material 632 is partially attached to a block-like transparent raw material 633 so as to project the image in a curved surface shape. This structure can provide an effect that as if the image is displayed in the air. FIG. 11D shows an example in which an incident part 634 for an image is a curved surface and a projecting surface 635 for the image is also a curved surface. This structure enables a strain of the image to be reduced when the image is displayed in a cubic form.

Figure 12A:
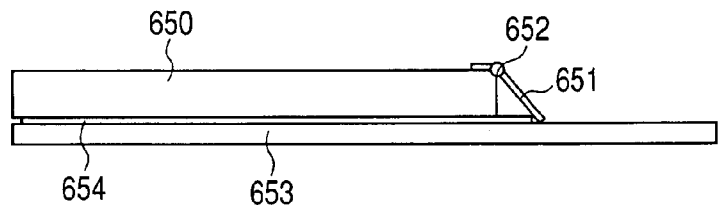
FIGS. 12A, 12B, and 12C show some examples of a mechanism for performing a fine adjustment of an optical reflection.
Figure 12B:
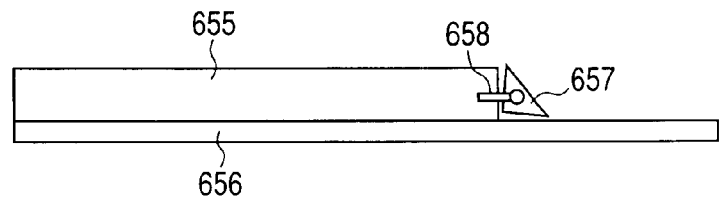
Figure 12C:
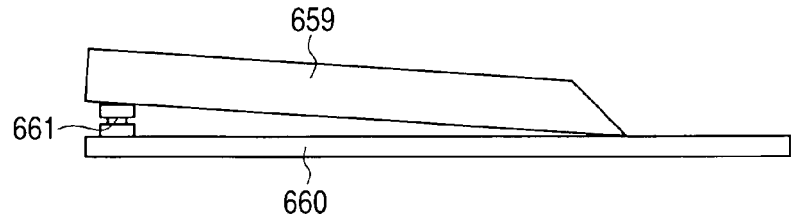

Next, referring to FIGS. 12A to 12C, there will be described a mechanism for use in performing a fine adjustment of reflection of light at the back of a shelf. In FIG. 12A, a shelf 650 is fixed under application of a hinge 652 capable of freely bending a mirror 651 arranged at the back of a shelf 650. In addition, an angle of the mirror 651 can be adjusted by arranging a spacer 654 between the shelf 650 and a structure 653 supporting the shelf and moving the spacer in a forward or rearward direction. Next, in FIG. 12B, the shelf 655 is placed at the structure 656 for supporting the shelf and then a transparent raw material 657 of triangular column machined to form a slant surface, for example, is connected to the shelf 655 by a fixing tool 658. The transparent raw material 657 can be turned freely and its reflecting angle can be adjusted. Next, in FIG. 12C, the shelf 659 of transparent raw material machined into a slant shape is placed at the structure 660 supporting the shelf in such a way that its back may be contacted with the ground surface of the structure, and a spacer 661 is arranged at the front of the shelf 659. A reflecting angle at the back can be adjusted by moving up or down the height of the spacer 661.

Second Embodiment

Figure 13:
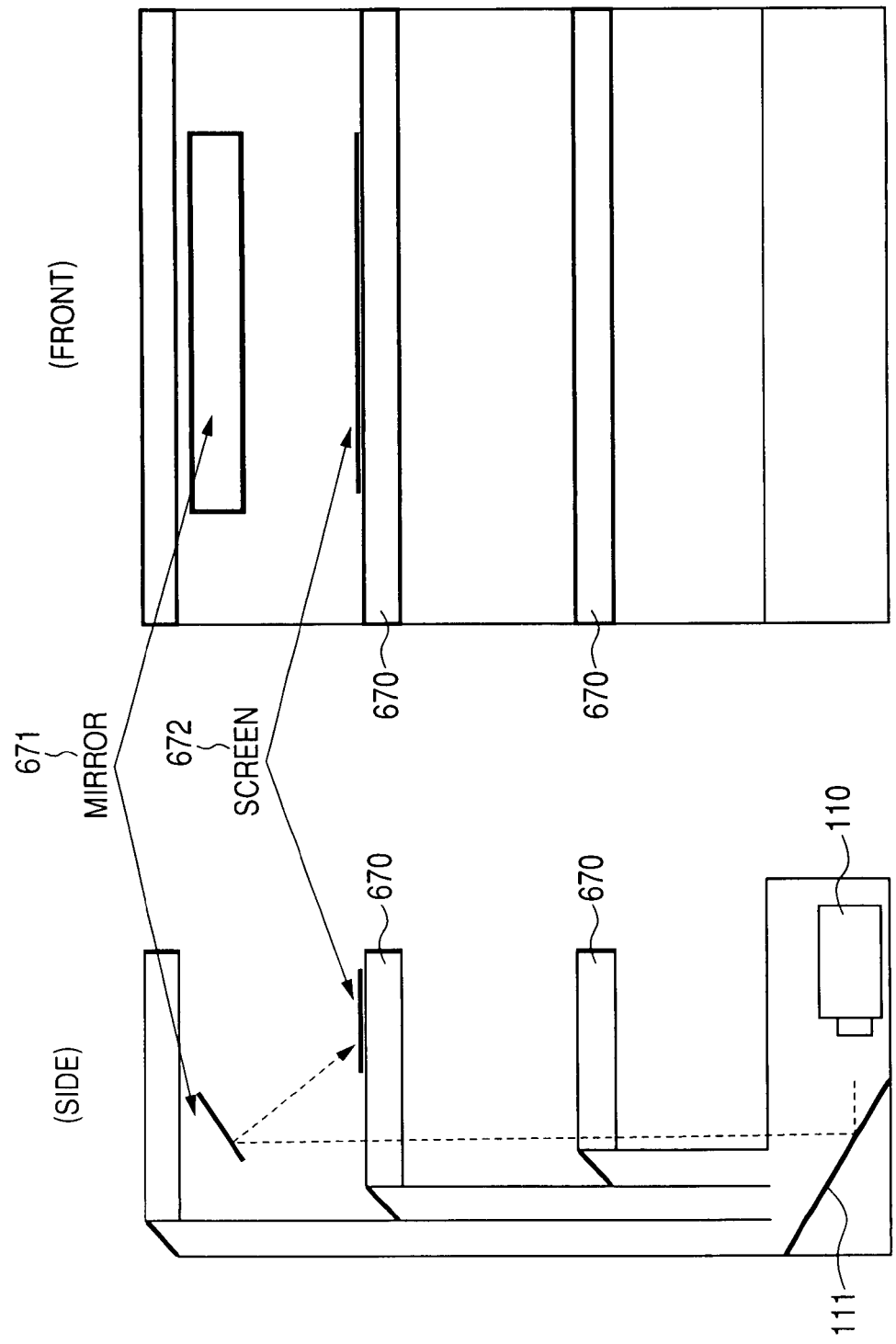
FIG. 13 is an illustrative view for showing a first structure for projecting an image to a location other than the end of a shelf of one preferred embodiment of the present invention.

Next, there will be described a method for projecting an image to a place other than the end of the shelf-like member. At first, referring to FIG. 13, there will be described a method for projecting an image to the upper surface of a shelf. FIG. 13 shows a side elevational view and a front elevational view of a shelf. The image projected by the projector 110 is reflected upward by a mirror 111, passes through a shelf 670 of transparent raw material, is reflected downward by a mirror 671 mounted at the lower portion of the shelf and the image is projected to a screen 672 arranged at the upper portion of the shelf. Projection of the image onto the upper surface of the shelf through this method enables an image to be projected to goods placed on the shelf or the image to be displayed around the goods.

Figure 14:
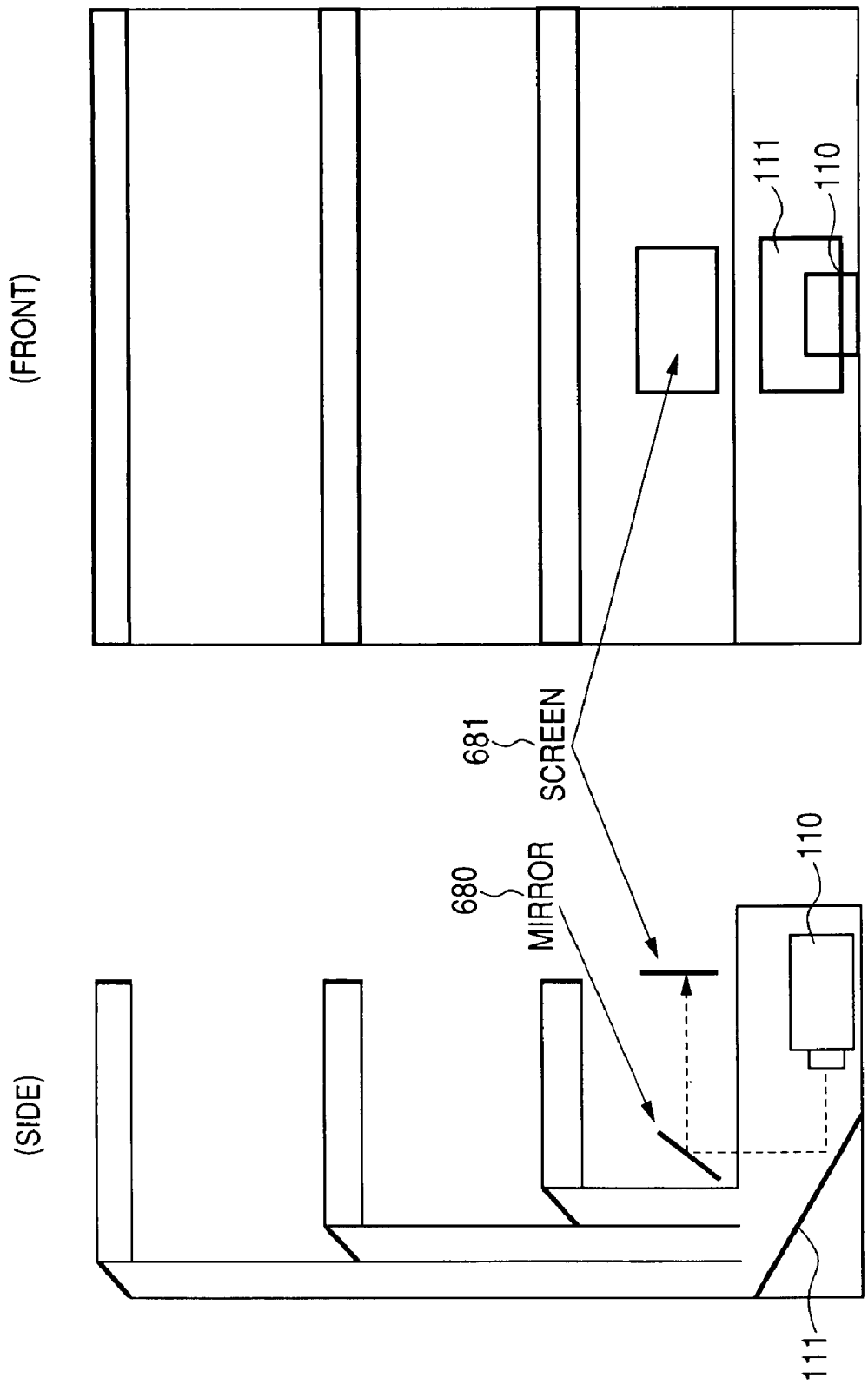
FIG. 14 is an illustrative view for showing a second structure for projecting an image to a location other than the end of a shelf of one preferred embodiment of the present invention.

Next, referring to FIG. 14, there will be described a method for projecting an image to the screen arranged at a shelf in a vertical orientation. The image projected by the projector 110 is reflected by the mirror 111 and the mirror 680 and projected to the screen 681 arranged at the upper surface of the shelf. Projection of an image to a vertical screen by this method enables an image of existing standard of 4:3, for example, to be displayed.

Figure 15:
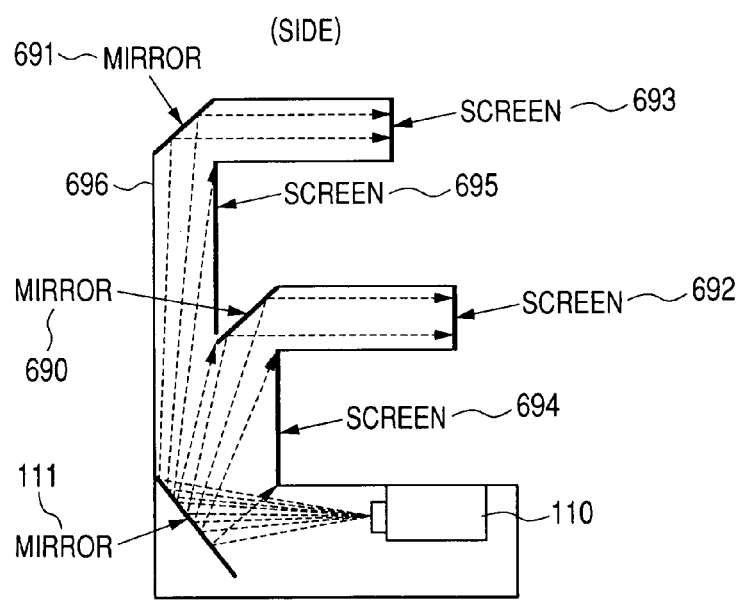
FIG. 15 is an illustrative view for showing a third structure for projecting an image to a location other than the end of a shelf of one preferred embodiment of the present invention.

Next, referring to FIG. 15, there will be described a method for projecting an image to a back between the shelves. A part of the image projected by the projector 110 is reflected by the mirror 111 as described above, reflected by the mirrors 690 and 691 and projected to the screens 692 and 693 at the ends of the shelf. A part of another image is projected to the screens 694 and 695 applied to the surface of a deep part between the shelves. At this time, since an incident angle to the screen 695 is shallow and a view angle from the projector in respect to a projecting area becomes narrow, a resolution of the image to be projected to the screen 695 is decreased. Since an effective resolution is smaller than that of the part projected to the end of a shelf, the resolution can be increased by machining the back 696 of the shelf into a slant surface or widening the depth size, adjusting both position and angle of the mirror 111 and making the incident angle to the screen 695 deeper.

Third Embodiment

Since optical path lengths from the projector to each of the screens are different from each other, the methods described above up to now correct the image projected from the projector so as to correct a difference in magnifying powers caused by the difference in optical path length and perform an output display. In turn, setting the optical path lengths ranging from the projector to each of the screens substantially equal to each other in this preferred embodiment eliminates an image correcting processing. In addition, the preferred embodiment has an effect that the focal point is strictly set for every image because the optical path lengths ranging from the projector to each of the screens are substantially set equal to each other. This situation will be described in detail as follows.

Figure 16:
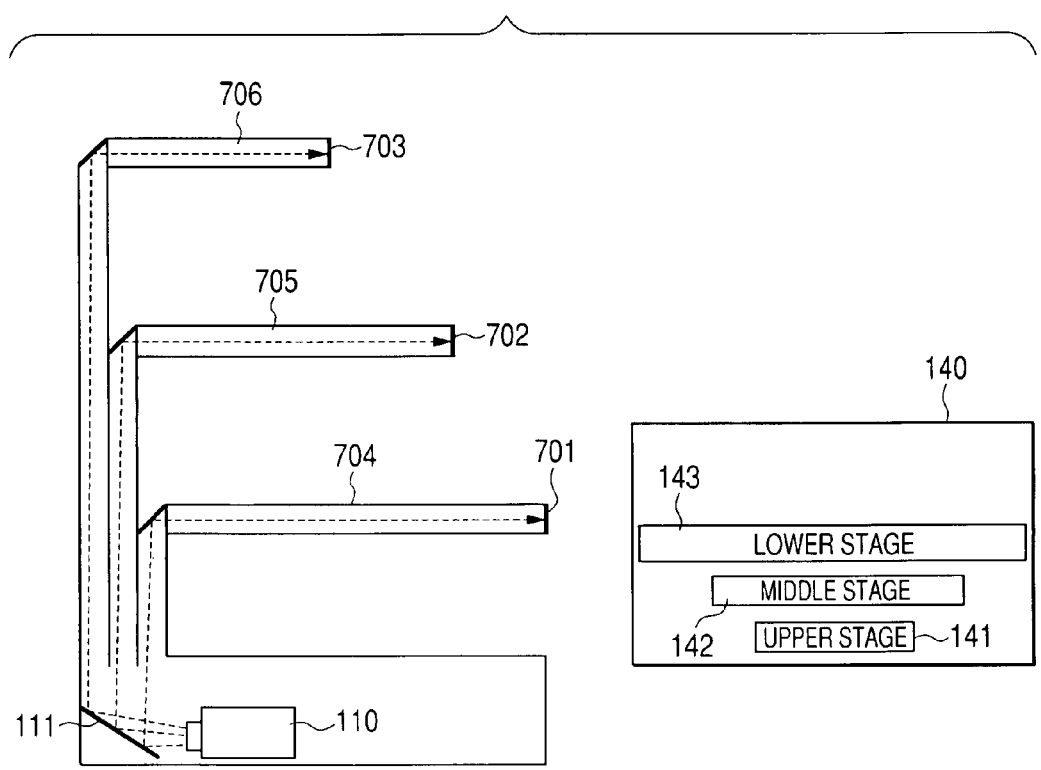
FIG. 16 is an illustrative view for showing a first structure in which optical path lengths in one preferred embodiment are substantially the same to each other.

Referring now to FIG. 16, there will be described a method for changing a depth of a shelf. Image projected from the projector 110 is projected to screens 701, 702 and 703 at the ends of the shelves in the same manner as described above. The optical path lengths can be set substantially the same to each other by adjusting the depths 704, 705, and 706 in such a way that the distances at this time ranging from the projector 110 to the ends 701, 702, and 703 of the shelves may become constant.

Figure 17:
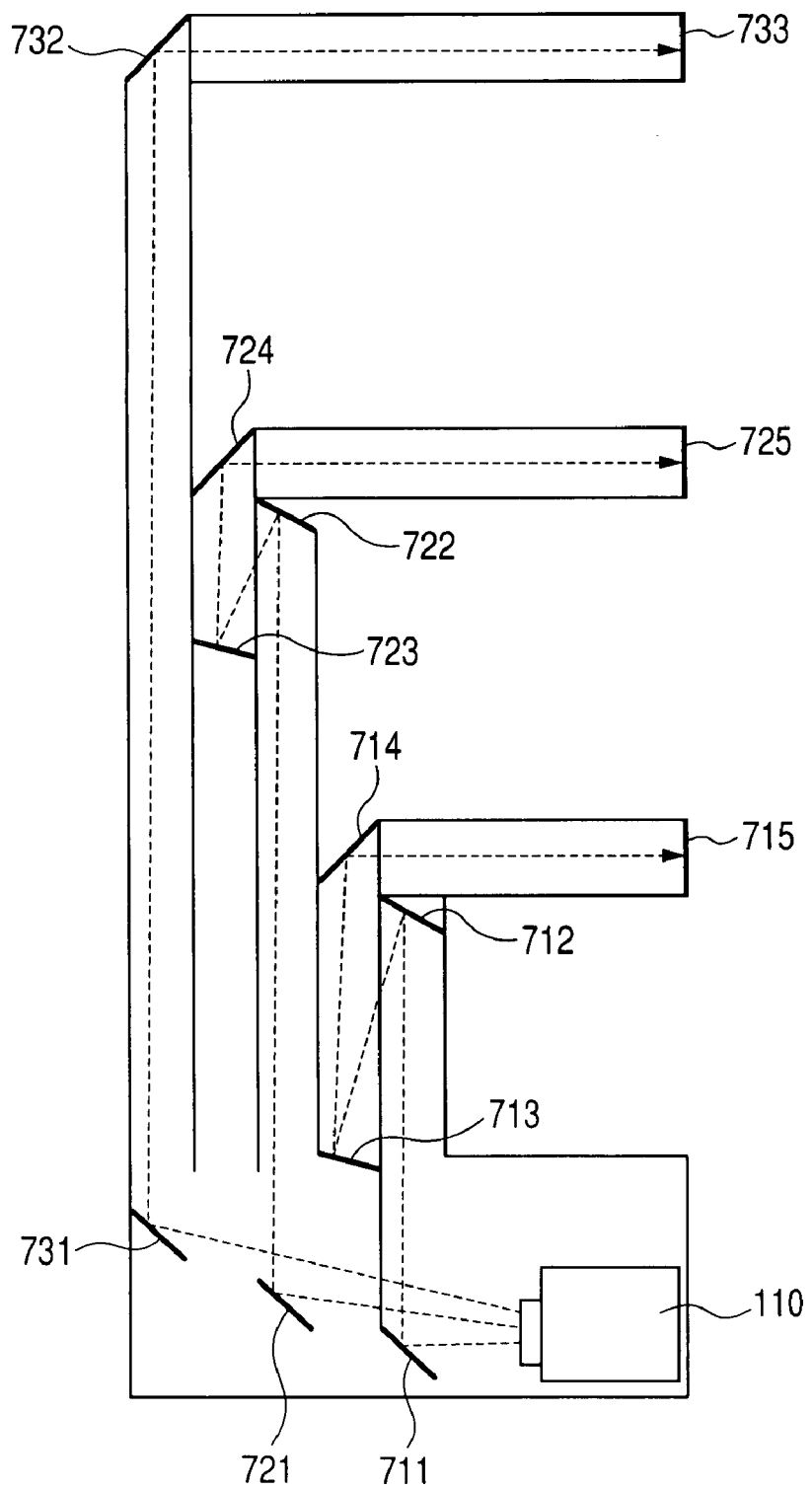
FIG. 17 is an illustrative view for showing a second structure in which optical path lengths in one preferred embodiment are substantially the same to each other.

Next, referring to FIG. 17, there will be described a method for increasing the number of times of reflection and adjusting an optical path length. A part of the image projected from the projector 110 is reflected by mirrors 711, 712, 713, and 714 and projected to a screen 715 at the end of a shelf. Similarly, another part of the image is reflected by mirrors 721, 722, 723, and 724 and projected to a screen 725 at the end of a shelf. In regard to the upper-most shelf, the image may be projected to a screen 733 at the end of the shelf through twice reflection at the mirrors 731 and 732 in the same manner as described up to now. At this time, the optical path lengths can be set substantially the same to each other by adjusting distances between the mirrors 712 and 713, and the mirrors 722 and 723 in such a way that the optical path lengths become constant with an optical path length ranging from the projector 110 to the screen 733.

Figure 18:
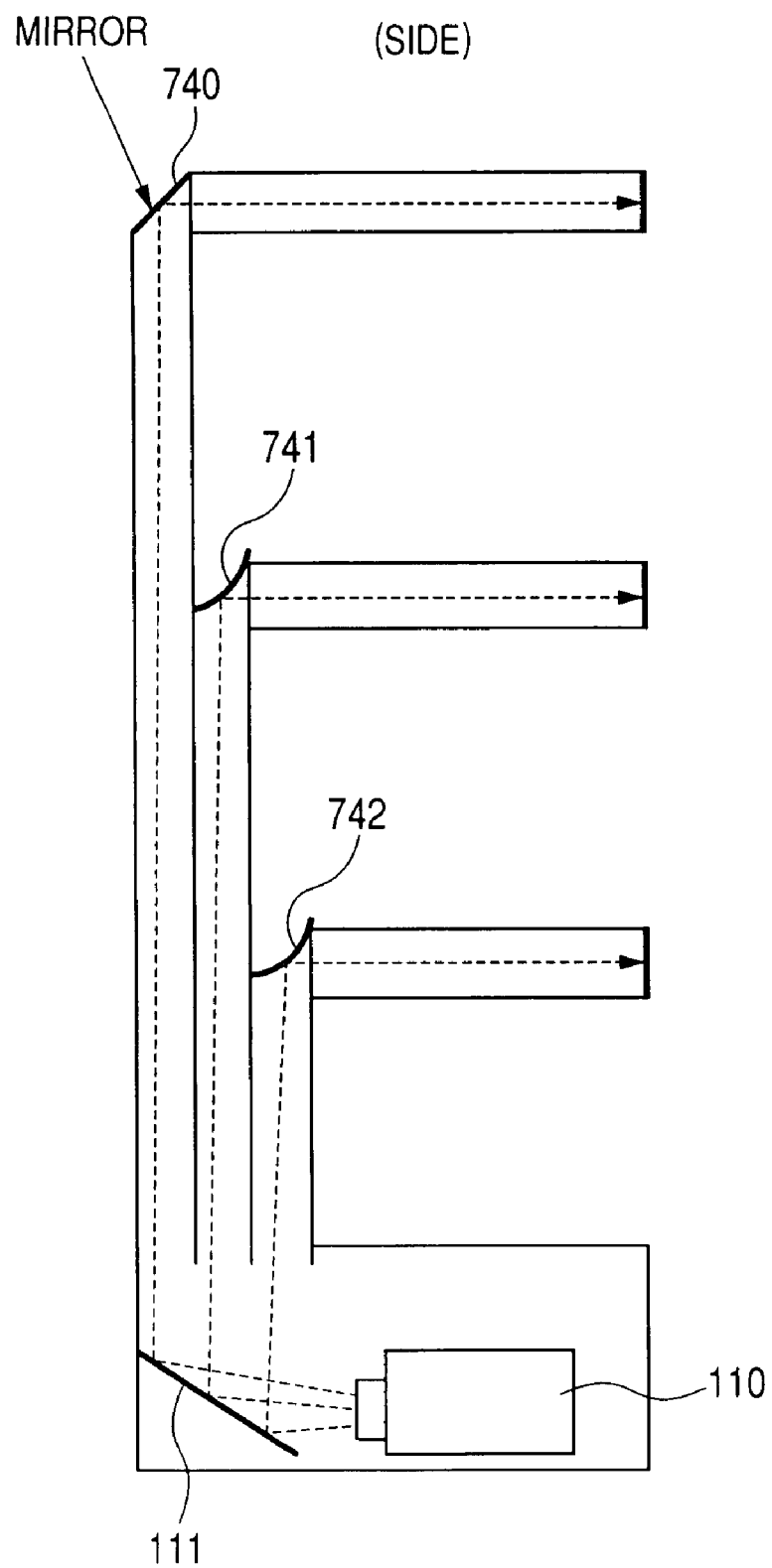
FIG. 18 is an illustrative view for showing a third structure in which optical path lengths in one preferred embodiment are substantially the same to each other.

Referring to FIG. 18, there will be described a method for aligning focal points by making a surface shape of each of the mirrors mounted at the backs of the shelves. That is, a correction is carried out by changing a curvature of the mirror in response to an optical path length for every shelf in such a way that a focal point is set to the end of each of the shelves. Its structure is similar to that shown in FIG. 1; in which when a mirror 740 at the upper-most shelf, for example, is set to have a flat surface, the focal point of the projector is aligned with the end of the upper-most shelf. Next, the surface shapes of mirrors 741 and 742 at other shelves are set to show curved surfaces curved in a vertical direction, thereby a displacement of focal points at the images projected at the end of each of the shelves can be corrected.

Fourth Embodiment

Figure 19A:
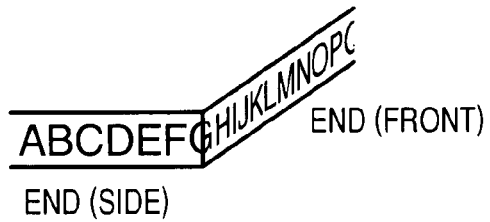
FIGS. 19A and 19B are illustrative views for showing a first structure for projecting an image to the side of a shelf of one preferred embodiment of the present invention.
Figure 19B:
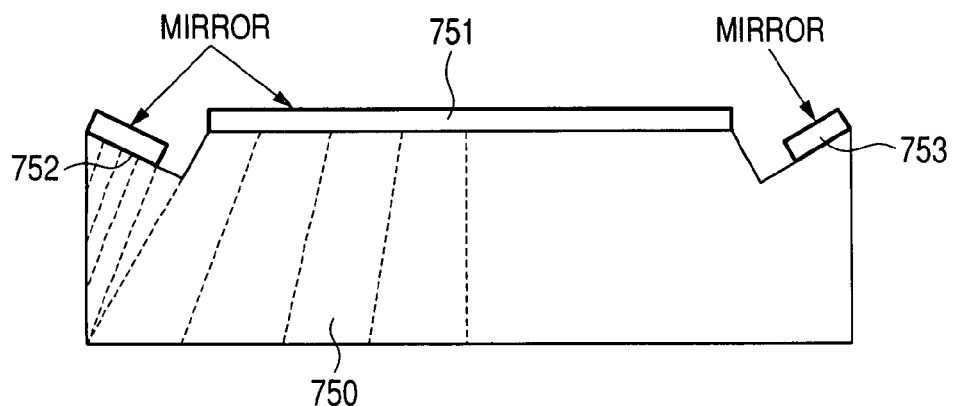

Next, there will be described a method for projecting an image also to the side of a shelf through machining of a shape of the shelf as shown in FIG. 19A. FIG. 19B is a view taken from above the shelf. Both ends of the back of the transparent raw material 750 of the shelf are cut into a triangle shape and each of the mirrors 751, 752, and 753 is arranged at the central part and both ends, respectively. The image reflected at the mirror 751 is projected to the front of the shelf and the image reflected by each of the mirrors 752, 753 is projected to the side of the shelf.

Figure 20A:
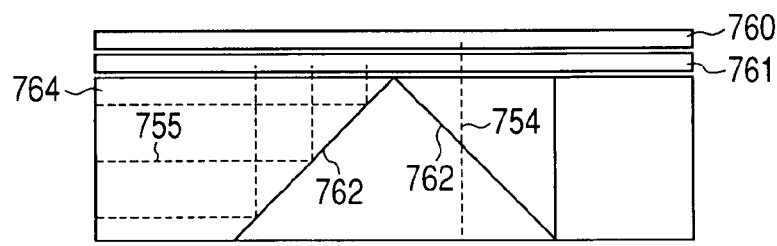
FIGS. 20A, 20B, and 20C are illustrative views for showing a second structure for projecting an image to the side of a shelf of one preferred embodiment of the present invention.
Figure 20B:
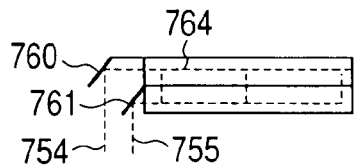
Figure 20C:
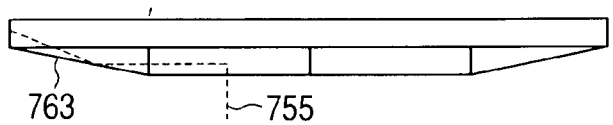

Next, referring to FIGS. 20A to 20C, there will be described a method for projecting an image also to the side of the shelf. FIG. 20A is a view taken from above, FIG. 20B is a view taken from side and FIG. 20C is a view taken from front, respectively. A part of light 754 projected from below is reflected by the mirror 760 and projected directly to the front end of the shelf. Another part 755 is reflected by the mirror 761, reflected by a surface 762 cut in a slant direction as viewed from above the lower portion, cut in a vertical direction as viewed from a horizontal direction, reflected in a slant upward direction by a surface 763 cut in a slant direction as viewed from the front both ends of the lower portion and projected to a side 764 of the shelf. Although the structure in respect to this method is complex, all the upper surfaces of the shelf can be utilized.

Fifth Embodiment

Figure 21A:
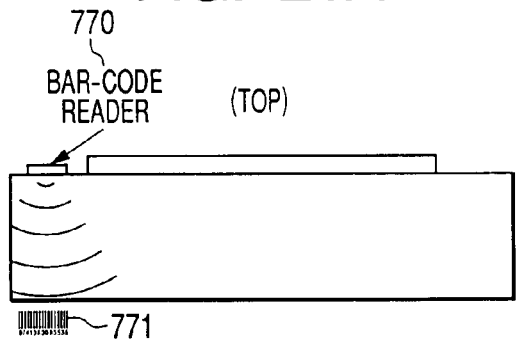
FIGS. 21A, 21B, 21C, and 21D show a first shelf-like display machine provided with a sensor of one preferred embodiment of the present invention.
Figure 21C:
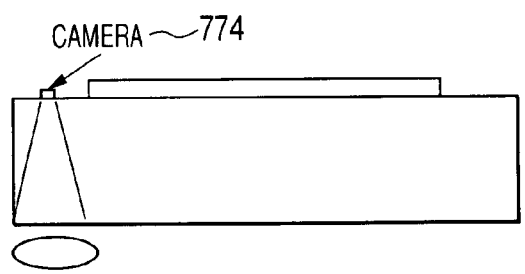
Figure 21B:
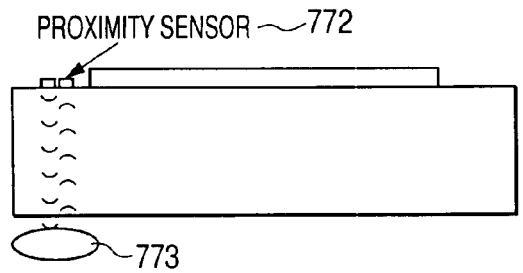
Figure 21D:
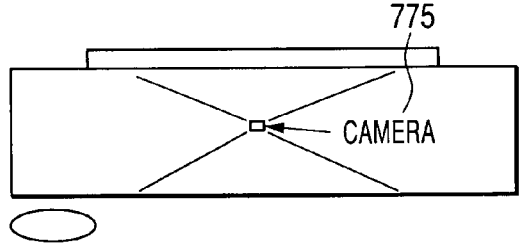

In order to perform an effective display of information, there will be described a method for detecting that a person approaches to the shelf or the goods are transferred. Referring to FIGS. 21A to 21D, there will be described a method detecting a state of the front of the shelf while a sensor is arranged at the back of the shelf. As shown in FIG. 21A, a bar-code reader 770 is arranged at the back of the shelf, and light of the bar-code reader passes through the inner portion of the shelf of raw material such as acryl resin or glass with a high transmittance. When a goods 771 attached with a bar-code is applied to the front of the shelf, the bar-code reader 770 reads the bar-code of the goods, sends the read value to the PC 130 in FIG. 1 and the related information can be displayed. With such an arrangement as above, a customer at a store applies the goods that the customer is interested in over the end of the shelf at its bar-code portion to allow the customer to review its related information. As shown in FIG. 21B, an infrared ray proximity sensor 772, for example, is arranged at the back of the shelf, the sensor detects at 733 that a person approaches to the front of the shelf or applies his hand over the front, similarly the sensor transmits it to PC 130 in FIG. 1 and then the corresponded information is displayed. With such an arrangement as above, it becomes possible to perform a separate operation for displaying the letter information assuming that it is read when the proximity sensor is operated and for displaying an image with a better visibility from a far location when the proximity sensor is not operated, for example. In addition, it may also be applicable to change an image to be displayed and a position where the image is displayed in response to at which position in which shelf the sensor is detected. As shown in FIG. 21C, a camera 774 may be used to perform an image processing in place of the proximity sensor. FIG. 21D shows an example in which the camera is mounted below the transparent shelf to detect whether or not the goods are removed from the shelf. When it is detected that the goods are removed from the shelf, this system can be used in such a way that either message or information about the goods is displayed to the person coming to a store.

Figure 22A:
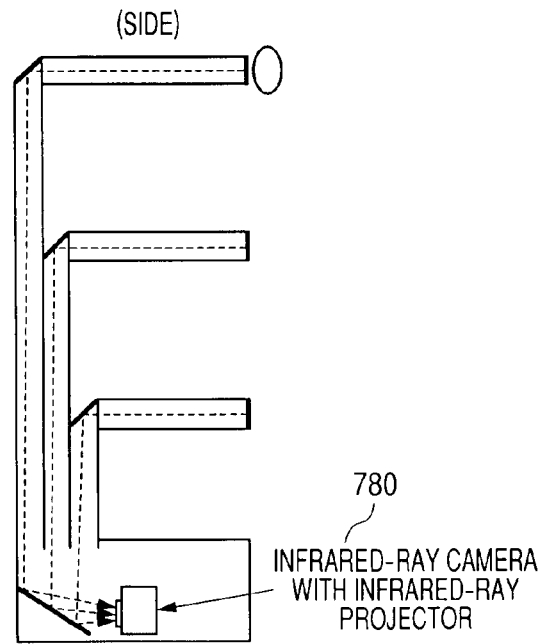
FIGS. 22A, 22B, and 22C show a second shelf-like display machine provided with a sensor of one preferred embodiment of the present invention.
Figure 22B:
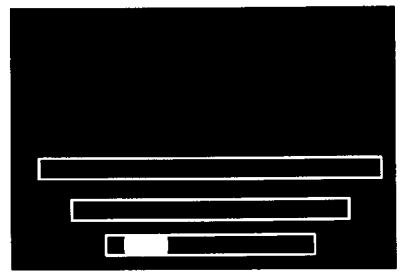
Figure 22C:
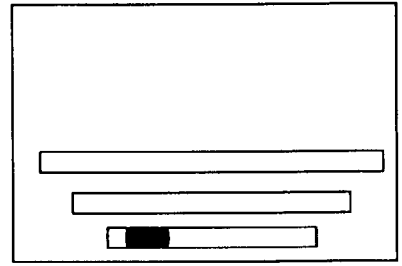

Next, referring to FIGS. 22A to 22C, there will be described a method in which the end of each of the shelves has a touch panel function. As shown in FIG. 22A, an infrared ray camera with an infrared ray projector is mounted near a location such as a side part of the projector 110 in FIG. 1 so as to attain the image at the end of the shelf in a direction opposite to the optical path facing from the projector to the end of the shelf. When the end of the shelf is touched by a customer, the image having a bright touched portion and remaining dark portions can be attained as shown in FIG. 22B, for example, and it is possible to detect which position in which shelf is touched by the customer. In addition, when an indoor area is fully filled with infrared rays, the image as shown in FIG. 22C cannot be attained unless the infrared ray projector is installed and also in this case, it is possible to detect which position in which shelf is touched by a customer. When it is detected through these methods that the left side in the upper stage is touched, for example, it becomes possible to replace the image displayed at the left side of the upper stage from PC and provide information suitable for a customer coming to a store.

Figure 23A:
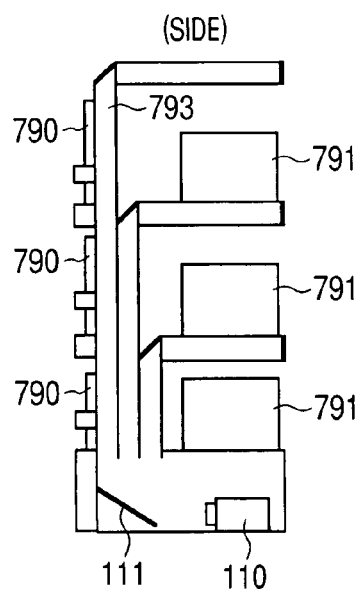
FIGS. 23A, 23B, 23C show a third shelf-like display machine provided with a sensor of one preferred embodiment of the present invention.
Figure 23B:
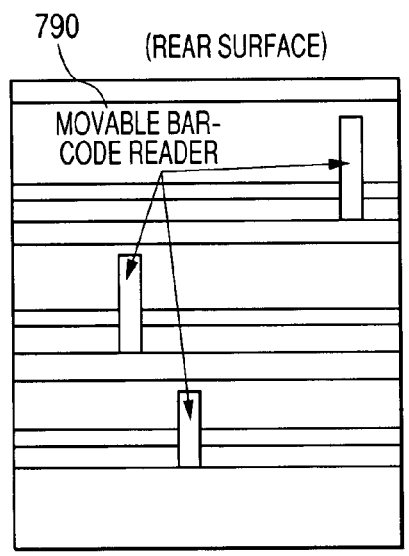
Figure 23C:
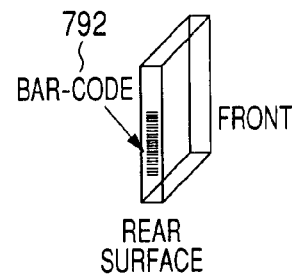

Next, referring to FIGS. 23A to 23C, there will be described a method for managing respective goods through a movable bar-code reader. FIG. 23A is a side elevational view of a shelf, FIG. 23B is a rear view, and FIG. 23C shows an example of goods to which a bar-code is attached. The rear of the shelf is provided with a movable bar-code reader 790, its position is controlled from PC 130 in FIG. 1, and a bar code 792 of the goods 791 at this position is read and transmitted to PC 130. An optical path 793 of light transmitted from the projector 110, reflected by the mirror 111 and advanced upward is partitioned by either the transparent raw material or formed into a hollow state partitioned by the transparent raw material and then the bar code of the goods 791 can be read from the rear. With such an arrangement as above, since it is possible to check what type of goods are placed at which position in which shelf, information corresponding to the position and the goods can be displayed at the end of the shelf. In addition, information for guiding a customer coming to a store to teach the customer that the desired goods are placed at which position in which shelf can be displayed by displaying either the letters or images indicating a direction such as arrow marks at the end of the shelf. In addition, since the goods can be individually managed, a work such as an inventory can be simplified. Further, the bar code to be attached to the goods is printed at either a tape or seal-like raw material having a capacitor or RFID tag assembled therein, thereby it can be simultaneously utilized as one for preventing any gate-type theft.

Figure 24A:
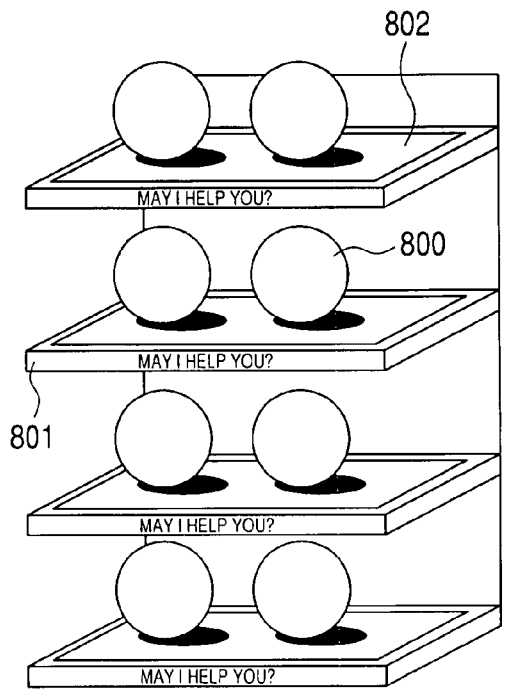
FIGS. 24A and 24B show a fourth shelf-like display machine provided with a sensor of one preferred embodiment of the present invention.
Figure 24B:
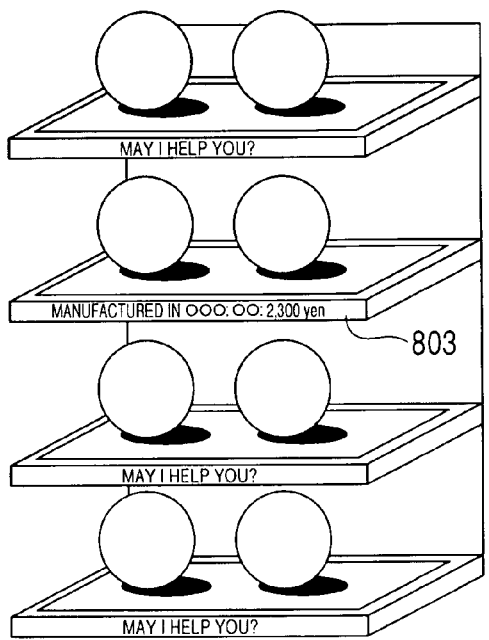

Next, referring to FIGS. 24A and 24B, there will be described a method for displaying information about the goods or the like at the end of a shelf when the items such as goods placed on the shelf portion are removed by a customer coming to a store or the like. FIG. 24A shows a state before goods 800 are removed from the shelf, in which general information or information about entire goods, for example, is displayed at an end 801 of the shelf. A RFID tag reader 802 is arranged at the upper surface of a shelf and an RFID tag is attached to the goods 800. FIG. 24B shows a state just after the goods 800 is removed and what type of goods is removed is detected with RFID tag reader 802. Individual information about the removed goods is displayed at the surface 803 of a shelf to enable detailed information about the goods removed by a customer coming to a store to be displayed.

Next, referring to FIG. 25, this figure shows an example of letters to be displayed at the end of a shelf. Reference numeral 810 denotes information such as prices of the goods placed on the shelf that corresponds to the conventional price tags. Reference numerals 811 and 812 denote displays about an advertisement of the goods concerned. Reference numerals 813, 814, and 815 denote displays about a store promotion that indicate the number of points, recruitment of members and thanks messages for customers coming to the store or the like. Reference numeral 816 denotes a display for use in visually guiding a traffic line for a customer coming to a store. Reference numeral 817 denotes a display indicating the position of goods. Reference numeral 818 denotes a display for use in guiding a customer coming to a store to an escaping path at the time of emergency. Reference numerals 819, 820, 821, and 822 denote examples for displaying information attracting the interest of a customer coming to a store, for example, weather forecast, news, horoscope and music played in the store or the like.

Sixth Embodiment

Figure 26:
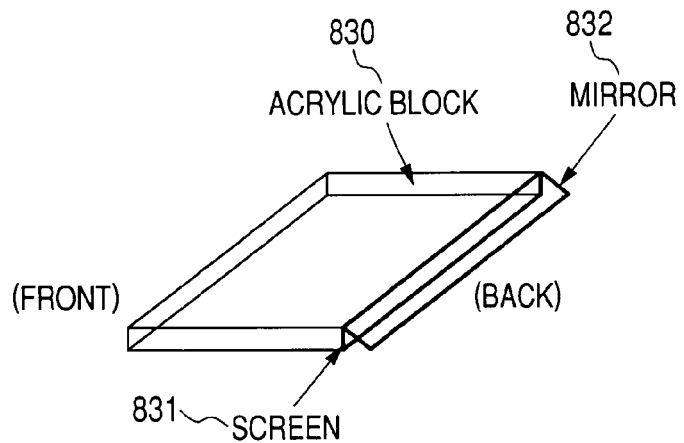
FIG. 26 is an illustrative view for showing a first structure for displaying an image at the back of a shelf of one preferred embodiment of the present invention.

Next, there will be described a method enabling a customer to see an image at the end of a back of a shelf, i.e. the image from the end of a shelf under application of characteristic of total reflection through the transparent raw material such as acryl resin or glass or the shelf enclosed by mirrors at its upper and lower sides, separate from the aforesaid method for displaying an image at the end of a front of a shelf in its dispersed or light collected state. FIG. 26 shows its configuration. Nothing is arranged at the front of the transparent raw material 830 such as an acrylic block, a screen raw material 831 is attached to the acrylic block at the back of a shelf and there is provided a mirror 832 reflecting the image from below to the screen raw material and projecting it.

Figure 27A:
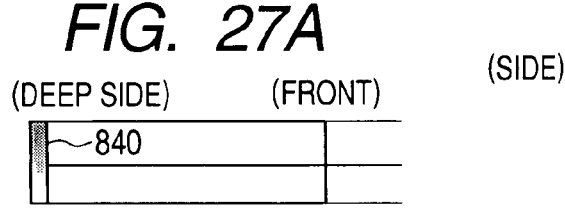
FIGS. 27A, 27B, 27C, and 27D are illustrative views for showing a second structure for displaying an image at the back of a shelf of one preferred embodiment of the present invention.
Figure 27B:
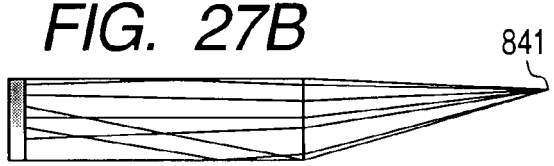
Figure 27D:
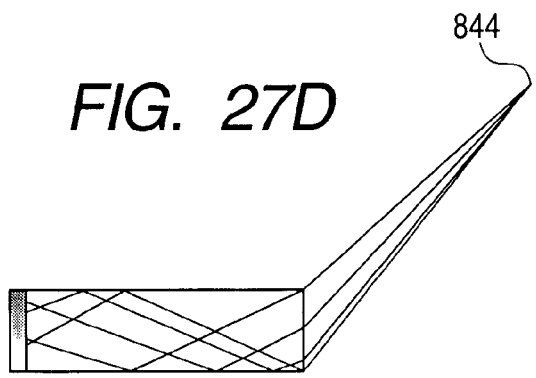
Figure 27C:
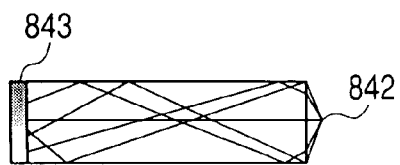

FIGS. 27A to 27D show side elevational views of shelves to show a positional relation between the back screen and a position of point of view. As shown in FIG. 27A, when the point of view is sufficiently far from a shelf and placed at the same height of the shelf, an image of the back screen 840 can be seen as it is. As shown in FIG. 27B, looking at a point of view 841 near to some extent shows that light is totally reflected at the upper part and lower part of the shelf, a part of the light can be seen in a correct opposite state and another part of the light can be seen under its upside down state. As shown in FIG. 27C, looking at a point of view 842 sufficiently near the end of the shelf, light is reflected by plural times at the upper and lower sides of the shelf, it is possible to see an image where plural images at the screen 843 are repeated like a kaleidoscope, for example. As shown in FIG. 27D, even in the case that the point of view 844 is seen at the height different from the shelf, light is reversed at the upper and lower sides of the shelf and the image can be seen.

Figure 28A:
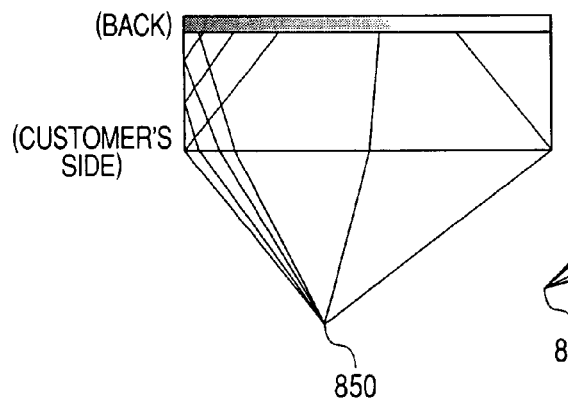
FIGS. 28A and 28B are illustrative views for showing a third structure for displaying an image at the back of a shelf of one preferred embodiment of the present invention.
Figure 28B:
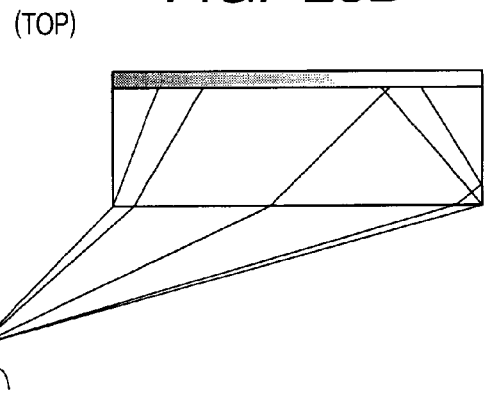

FIGS. 28A and 28B are views taken from above the shelf and show a positional relation between the back screen and the position of point of view. It is possible to see the image projected to the back screen in response to a reflecting characteristic inside the shelf as well as in the case that the point of view 850 is placed at the front of the shelf as shown in FIG. 28A and in the case that the shelf is seen from the slant point of view 851 in the same manner as that of the side.

Figure 29:
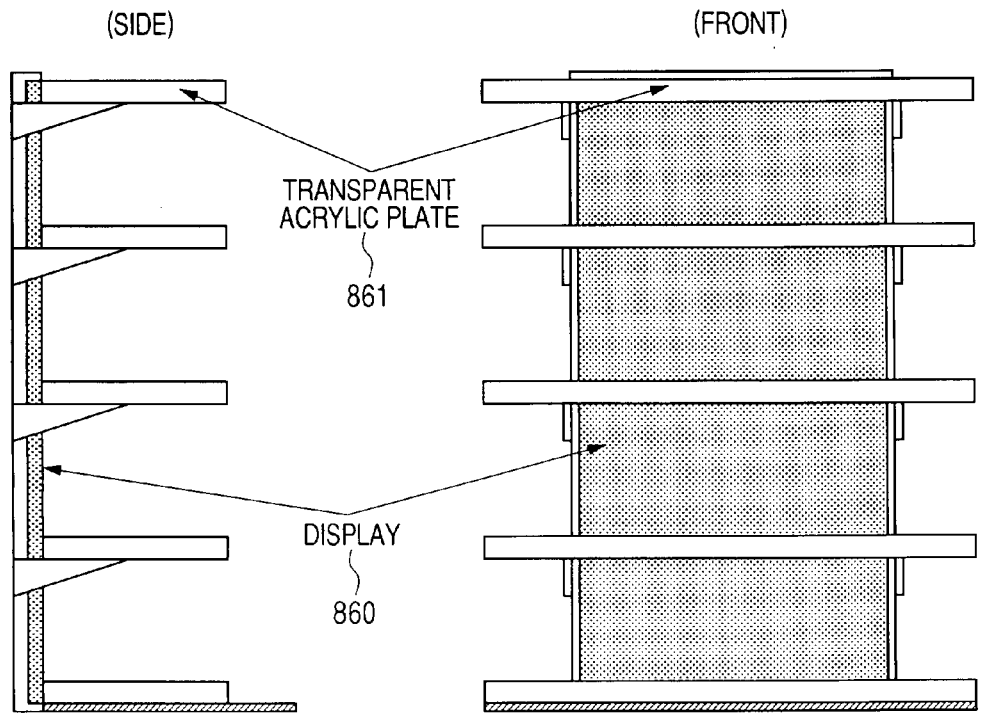
FIG. 29 is a view for showing a state in which display devices are arranged at the rear of a shelf to display images.
Figure 32:
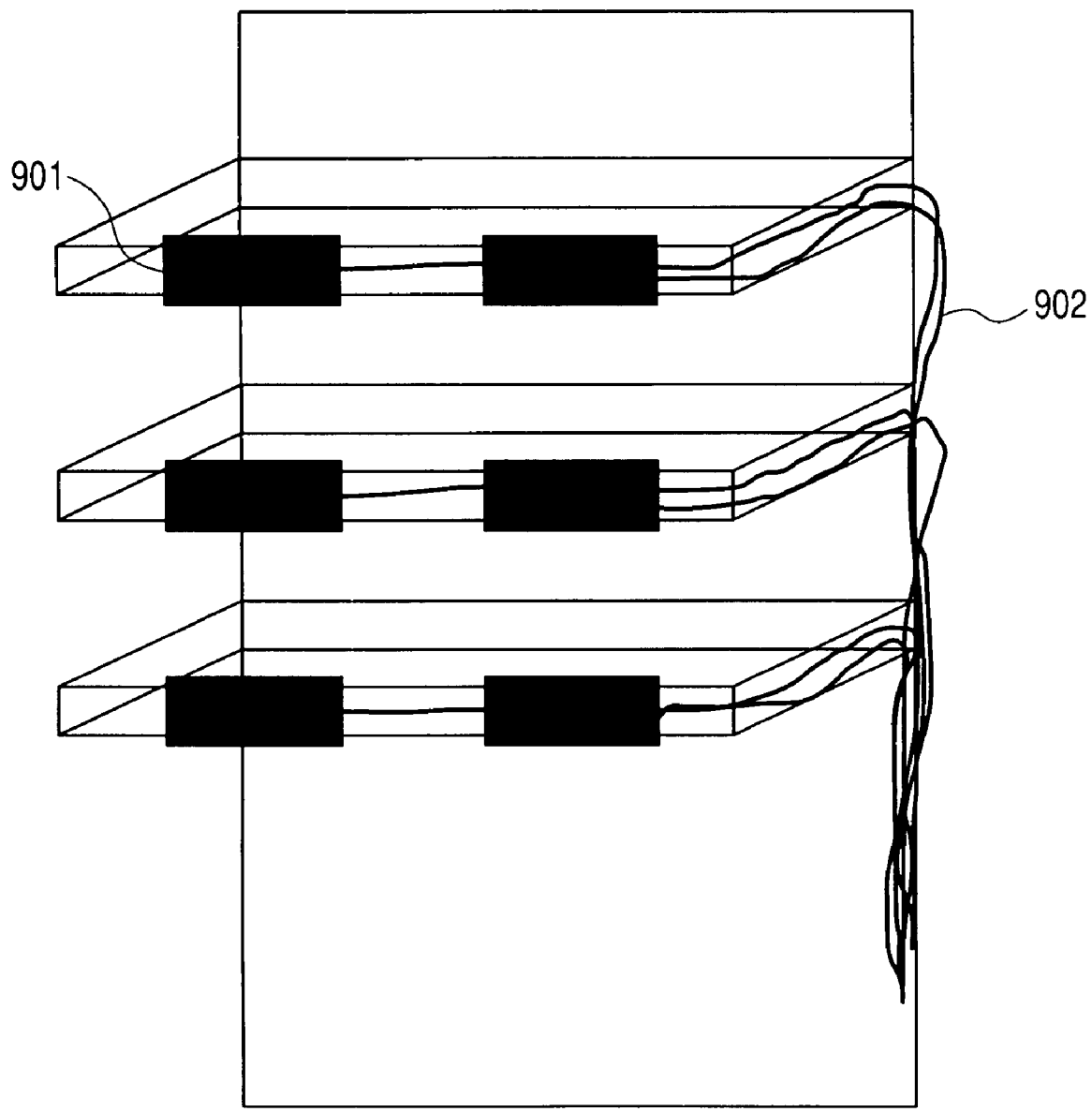
FIG. 32 is an illustrative view for showing the structure of the prior art.

FIG. 29 shows an example in which the effect described in reference to FIGS. 27 and 28 is embodied under application of a display device such as a liquid crystal display or a plasma display in place of projecting an image at the end of the shelf by the projector and the mirror. The back of the shelf is provided with a display 860 and its front is provided with a shelf plate 861 of transparent raw material such as acryl or glass.

FIG. 30 shows an example using a rear projection system in place of the aforesaid display device. The back of the shelf is provided with a screen raw material 870 and its front is provided with a shelf 871 of transparent raw material such as acryl. The image projected from a projector 872 is projected by the mirror 873 to the screen 870.

Different images are displayed at the end of the shelf and the back of the shelf as shown in FIG. 31A under application of the methods in FIG. 29 and FIG. 30 described above, it is possible to see the image 880 displayed on the end of the shelf as if it is floated up as shown in FIG. 31B.

It can be utilized as a shelf-like display machine capable of effectively transmitting information on goods to a store visiting customer at the store selling goods.

What is claimed is:

1. A shelf-like display machine comprising:
   a light source for outputting an image;
   a first reflector member for reflecting the image projected from said light source;
   a first shelf plate and a second shelf plate in which light can be transmitted through their inner portions;
   a rear member supporting said first and second shelf plates in which light can be transmitted at their inner portions;
   a second reflector member for guiding the image reflected by said first reflector member and guided through said rear member to said first shelf plate; and
   a third reflector plate for guiding the image reflected by said first reflector member and guided through said rear member to said second shelf plate;
   wherein:
   said image has a first image and a second image,
   and said light source outputs said first image and said second image upon performing a correction processing to said first image and said second image in correspondence with an optical path length 1 ranging from said light source to the end of said first shelf plate and an optical path length 2 ranging from said light source to the end of said second shelf plate in such a way that said first image is displayed at the end of said first shelf plate opposite to said rear member and said second image is displayed at the end of said second shelf plate opposite to said rear member.

2. The shelf-like display machine according to claim 1, wherein said correction processing is a correction processing to expand or reduce said first image and/or said second image in such a way that a difference in magnifying power caused by a difference between said optical path length 1 and optical path length 2 is corrected.

3. The shelf-like display machine according to claim 2, wherein said image is an image outputted from a computer and height information of said first and second shelf plates, shelf thickness information and shelf depth length information can be set on said computer.

4. The shelf-like display machine according to claim 3, wherein said computer calculates said optical path length 1 and optical path length 2 on the basis of said set information and performs said correction processing.

5. The shelf-like display machine according to claim 1, wherein a screen is applied to said end of said first and/or second shelf plate.

6. The shelf-like display machine according to claim 1, wherein said first and/or second reflector member is cut slant at the end of said shelf plate contacting with said rear member and said image is reflected at said cut surface.

7. The shelf-like display machine according to claim 1, wherein said first and/or second reflector member is constituted such that its angle can be adjusted.

8. The shelf-like display machine according to claim 1, wherein the end of said first and/or second shelf plate at said rear member and/or the end opposite to said rear member is constituted by a curved surface.

9. The shelf-like display machine according to claim 1, wherein said first and/or second shelf plate is constituted such that light transmitted inside the shelf plate shows a total reflection when it strikes against both front and rears of the shelf.

10. The shelf-like display machine according to claim 1, wherein said first and/or second image is an image outputted from the computer and a position and/or size of said first and/or second image can be adjusted on said computer.

11. The shelf-like display machine according to claim 1, wherein the side of said first and/or second shelf plate has a reflector member for reflecting said image toward said side so as to enable said first and/or second image to be displayed there.

12. The shelf-like display machine according to claim 1, wherein an end of said first and/or second shelf plate opposite to said rear member has a sensor for detecting a contacted state of an item from outside.

13. The shelf-like display machine according to claim 12, wherein said image is an image outputted from a computer, and said computer changes the outputted image in response to information detected by said sensor indicating that the contacted shelf corresponds to which shelf or which position in the shelf is contacted.

14. The shelf-like display machine according to claim 1, wherein said image is an image outputted from a computer, an RFID tag reader is arranged on said first and/or second shelf plate, a result of wireless detection of said RFID tag reader is constituted to be sent to the computer, and said computer changes the image to be outputted in response to said detected result.

15. A shelf-like display machine comprising:
   a light source for outputting an image;
   a first reflector member for reflecting the image projected from said light source;
   a first shelf plate and a second shelf plate in which light can be transmitted through their inner portions;
   a rear member supporting said first and second shelf plates in which light can be transmitted at their inner portions;

a second reflector member for guiding the image reflected by said first reflector member and guided through said rear member to said first shelf plate; and a third reflector plate for guiding the image reflected by said first reflector member and guided through said rear member to said second shelf plate; wherein:

said image has a first image and a second image, and an optical path length 1 ranging from said light source to the end of said first shelf plate and an optical path length 2 ranging from said light source to the end of said second shelf plate become substantially the same to each other in such a way that said first image is displayed at the end of said first shelf plate opposite to said rear member and said second image is displayed at the end of said second shelf plate opposite to the rear member.

16. The shelf-like display machine according to claim 15, wherein when said optical path length 1 is longer than said optical path length 2, arranging a third reflector member in the optical path of said optical path length 2 causes said optical path length 1 and said optical path length 2 to become substantially the same to each other.

17. The shelf-like display machine according to claim 15, wherein making a curvature of said first reflector member and a curvature of said second reflector member different to each other causes said optical path length 1 and said optical path length 2 to become substantially equal to each other.

18. An image display method for displaying an image on spaced-apart first and second screens arranged at one or more shelf plates of a shelf-like display machine comprising the steps of:

extracting a first region of which shape is similar to that of said first screen and a second region of which shape is similar to that of said second screen from said image while keeping a positional relation between said first and second screens;

extracting said first region and said second region from said image while scrolling them at a predetermined speed in a direction where said first region and said second region are connected;

correcting a difference in magnifying power caused by different optical path lengths ranging from a light source for projecting said image to each of the screens and correcting to expand or reduce said first region and/or said second region; and projecting said first region to said first screen and said second region to said second screen.

* * * * *